United States Patent
Kobayashi

(10) Patent No.: US 9,348,711 B2
(45) Date of Patent: May 24, 2016

(54) COPY CONTROL APPARATUS AND COPY CONTROL METHOD

(71) Applicant: FUJITSU LIMITED, Kawasaki-shi, Kanagawa (JP)

(72) Inventor: Naoki Kobayashi, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 126 days.

(21) Appl. No.: 14/332,724

(22) Filed: Jul. 16, 2014

(65) Prior Publication Data

US 2015/0067282 A1 Mar. 5, 2015

(30) Foreign Application Priority Data

Sep. 5, 2013 (JP) ................................. 2013-184185

(51) Int. Cl.
*G06F 11/20* (2006.01)
*G06F 3/06* (2006.01)
*G06F 11/14* (2006.01)

(52) U.S. Cl.
CPC ............ *G06F 11/2082* (2013.01); *G06F 3/065* (2013.01); *G06F 3/067* (2013.01); *G06F 3/0619* (2013.01); *G06F 3/0656* (2013.01); *G06F 11/14* (2013.01)

(58) Field of Classification Search
CPC ............ G06F 11/2069; G06F 11/2082; G06F 11/1451; G06F 11/1466; G06F 11/2064; G06F 11/2074
See application file for complete search history.

(56) References Cited

U.S. PATENT DOCUMENTS

| 7,062,621 | B2 | 6/2006 | Mizuno et al. | |
| 7,356,657 | B2 | 4/2008 | Mikami | |
| 8,996,827 | B1* | 3/2015 | Natanzon | 711/162 |
| 2003/0051111 | A1* | 3/2003 | Nakano et al. | 711/162 |
| 2004/0049649 | A1* | 3/2004 | Durrant | 711/165 |
| 2010/0030986 | A1 | 2/2010 | Shinozaki et al. | |

FOREIGN PATENT DOCUMENTS

| JP | 11-15604 | 1/1999 |
| JP | 2005-122611 | 5/2005 |
| JP | 2007-80131 | 3/2007 |
| JP | 2010-39574 | 2/2010 |

* cited by examiner

*Primary Examiner* — Reginald Bragdon
*Assistant Examiner* — Thanh Vo
(74) *Attorney, Agent, or Firm* — Staas & Halsey LLP

(57) ABSTRACT

A copy control apparatus includes a processor. The processor is configured to record, in update location information, an update count for each of sectional areas obtained by sectioning a copy-source area. The update count indicates a number of updates of data in a sectional area. The update count is indicative of more than two values. The processor is configured to perform first copy of copying data in the copy-source area to a copy-destination area based on the update location information. The processor is configured to deter the first copy for data in a sectional area for which an update count indicating more than a predetermined number is recorded in the update location information.

6 Claims, 20 Drawing Sheets

FIG. 6

| GENERATION | RECORDED UPDATE LOCATIONS IN COPY-SOURCE BUFFER | RECORDED UPDATE LOCATIONS IN COPY-DESTINATION BUFFER |
|---|---|---|
| 1 | 1000-2000 | NONE |
| 2 | 1500-3000  B1 | 1801-3000 |
| 3 | 900-1800 | 900-1800 |
| 4 | 4000-5000 | 4000-5000 |
| TRANSFER LOCATIONS | 900-3000,4000-5000 | 900-3000,4000-5000 |

FIG. 8

| UPDATE AMOUNT/LINE SPEED | ⇒ | PRIORITY | ⇒ | DATA TRANSFER AMOUNT | FREQUENCY |
|---|---|---|---|---|---|
| UPPER 20% OF ALL HOUSINGS | ⇒ | HIGH | ⇒ | UPPER LIMIT OF LINE SPEED | MAXIMUM FREQUENCY |
| MIDRANGE 30% OF ALL HOUSINGS | ⇒ | MIDDLE | ⇒ | 70% OF LINE SPEED | 70% |
| LOWER 50% OF ALL HOUSINGS | ⇒ | LOW | ⇒ | 50% OF LINE SPEED | 50% |

COPY CONTROL APPARATUS AND COPY CONTROL METHOD

CROSS-REFERENCE TO RELATED APPLICATION

This application is based upon and claims the benefit of priority of the prior Japanese Patent Application No. 2013-184185, filed on Sep. 5, 2013, the entire contents of which are incorporated herein by reference.

FIELD

The embodiments discussed herein are related to a copy control apparatus and a copy control method.

BACKGROUND

When data copying is performed between storage housings at remote locations, integrity of data written in a copy-source logical unit may be demanded. Hereinafter, a term "logical unit number (LUN)" may also be used to refer to a logical unit having the LUN and data stored in the logical unit. An example of data copying as described above is copying "data that becomes meaningless unless integrity of the entire data at that moment is established", such as a database.

For example, in backup of a database to a remote location, consider a case in which the database includes data with an update date and time, update data A, and update data B forming a meaningful set of data. When data is simply copied starting from the head of a volume, from the copy-source LUN to a copy-destination LUN, if copying is interrupted due to a line failure or the like, only the update date and time and the update data A may be copied, and the update data B may be left before copying.

At this point in time, the set of data stored in the copy-destination LUN does not keep integrity, and becomes a data group that is meaningless until copying is restarted and completed. In this state, if the copy-source LUN is lost due to a disaster such as an earthquake or fire, a disc failure, or the like, the data is not updated to the latest state or returned to the previous state. That is, the whole set of data is lost. Therefore, a copying method is desired in which integrity is kept in a copy destination even if a copy source becomes incapable of copying due to a disaster, failure, or the like.

Thus, as inter-housing copying to ensure data integrity, a method may be taken in which a buffer is used for copying in an updating order while data integrity is kept.

FIG. 18 is a diagram illustrating an inter-housing copying scheme of related art using buffers.

In a storage system 100 depicted in FIG. 18, memories (not depicted) included in a copy-source housing 200 and a copy-destination housing 300 provide a plurality of buffers 210 and 310, respectively. Copy-source LUNs #1 and #2 of the copy-source housing 200 are copied to copy-destination LUNs #1 and #2 of the copy-destination housing 300, respectively.

In the above-described storage system 100, when the copy-source LUN #1 and the copy-destination LUN #1 are equivalent to each other, and the copy-source LUN #2 and the copy-destination LUN #2 are equivalent to each other, data updated in the copy-source LUNs #1 and #2 are stored in the buffers 210 in an updating order.

The data stored in the buffers 210 is transferred to the copy-destination housing 300 in units of buffer at the moment when the buffers 210 are depleted or a predetermined time elapses. Since data to be copied is stored in each buffer 210 in an updating order, the data is written as a collection of data with integrity in the copy-destination LUNs #1 and #2. Thus, in the copy-destination housing 300, data with integrity is copied.

One sequence from the start to end of copy processing is referred to as a copy session, and the buffers 210 in the copy source and the buffers 310 in the copy destination are respectively provided as many as the number of copy sessions for inter-housing copying.

In the storage system 100 depicted in FIG. 18, the LUNs #1 and #2 of the copy source share a buffer 210, and the LUNs #1 and #2 of the copy destination share a buffer 310. Thus, not only integrity in each LUN but also integrity between the LUN #1 and the LUN #2 may be kept. By setting copying from the copy-source LUN #1 to the copy-destination LUN #1 and copying from the copy-source LUN #2 to the copy-destination LUN #2 together as one copy session, the LUNs in the copy session have integrity in the copy-source housing 200 and the copy-destination housing 300.

FIG. 19 is a diagram illustrating an inter-housing copying scheme of related art using a differential bitmap.

In some cases, copying using buffers may not be available (a halt state) and the data updating order in buffers 210 and 310 may not be ensured, for example, immediately after the start of a copy session, in a case of a line failure, or depletion of the buffers 210 owing to excessive data updates or the like. In this state, data integrity is not ensured in a copy-source housing 200.

To address this, in a known scheme, the buffers 210 are not used in a halt state, and data update locations recorded in the buffers 210 and data update locations until copy session recovery are recorded in a differential bitmap 211.

When the copy session is recovered, as depicted in FIG. 19, the differential bitmap 211 is referred to, and data at updated locations is copied (differential copying) to copy-destination LUNs #1 and #2 until LUNs #1 and #2 of the copy source and the copy destination become equivalent to each other again. In differential copying, the data at updated locations is copied regardless of ordering.

During differential copying, that is, until differential copying is completed, the integrity of the data in a copy-destination housing 300 is not ensured.

Therefore, if the data in the copy-source LUNs #1 and #2 is lost due to a disaster, failure, or the like, only the meaningless data without integrity is left in the copy-destination LUNs #1 and #2, thereby causing a data loss.

FIG. 20 is a diagram illustrating an inter-housing copying scheme of related art using a save area to keep integrity during differential copying.

In a storage system 100 depicted in FIG. 20, a copy-destination housing 300 includes a plurality of save areas 311.

In the copy-destination housing 300, data before update at locations in copy-destination LUNs #1 and #2 to be updated with data transmitted from copy-source LUNs #1 and #2 is saved to the save areas 311 during differential copying. The save areas 311 are formed on, for example, a memory, a parity track, or a spare disc, and continuously retain the data before update until differential copying ends and copy session recovery ends.

Even if the data in the copy-source LUNs #1 and #2 is lost during differential copying due to a disaster, failure, or the like, the data saved in the save areas 311 in the copy-destination housing 300 is written back to the copy-destination LUNs #1 and #2. With this, in the copy-destination housing 300, at least the data with integrity before differential copying is recovered, and a data loss is deterred.

In the above-described storage system 100, in copying from the copy-destination LUNs to the save areas 311 performed in data saving, upon a data update request, data before update in only a requested portion is saved in the save areas. Thus, data copying is performed with a smaller capacity and shorter time compared with copying the entire LUNs. Therefore, as the save areas 311 for retaining data with integrity, those with a certain size are enough for one LUN.

Related techniques are disclosed in, for example, Japanese Laid-open Patent Publication No. 2010-39574 and Japanese Laid-open Patent Publication No. 11-15604.

However, in the storage system 100 of related art as depicted in FIG. 20, if a data update request for data with a capacity larger than the save areas 311 comes to the copy-destination LUNs, the data before update is not able to be saved or retained, and therefore the copy session becomes in an error state.

The higher a data update frequency of the copy-source LUNs is, the more the capacity of the save areas 311 is to be provided.

For example, consider a case in which data update is performed at a frequency with which data transfer between the buffers 210 and 310 becomes too late, causing a halt state, and the copy-source LUNs are continuously updated at a high frequency even during differential copying.

In this case, there may be a possibility of data update on almost an entire area of the copy-source LUNs until differential copying is completed. Therefore, the save areas 311 needs to have a capacity similar to that of the copy-source LUNs. That is, the volume capacity in the copy-destination housing 300 including the save areas 311 may become twice as large as the current volume capacity.

Therefore, in order to keep data integrity in copy sessions among a plurality of housings, the copy-destination housing 300 may have to have the save areas 311 with an enormous capacity (for example, several TB or larger), thereby disadvantageously increasing cost.

SUMMARY

According to an aspect of the present invention, provided is a copy control apparatus including a processor. The processor is configured to record, in update location information, an update count for each of sectional areas obtained by sectioning a copy-source area. The update count indicates a number of updates of data in a sectional area. The update count is indicative of more than two values. The processor is configured to perform first copy of copying data in the copy-source area to a copy-destination area based on the update location information. The processor is configured to deter the first copy for data in a sectional area for which an update count indicating more than a predetermined number is recorded in the update location information.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating exemplary recorded update locations and actual transfer locations of each generation in a copy-source buffer in a storage system according to an embodiment;

FIG. 8 is a diagram illustrating an exemplary priority setting table in a storage system according to an embodiment;

DESCRIPTION OF EMBODIMENTS

Embodiments of the copy control apparatus and copy control method are described below with reference to the drawings. However, the embodiments described below are merely examples, and it is not intended to exclude various modification examples and technical applications not clarified in the embodiments. That is, the embodiments may be implemented as being variously modified within a range not deviating from the gist of the embodiments. Also, in each drawing, it is not intended to include only the components depicted therein, and other functions and so on may be included.

Figure 1:
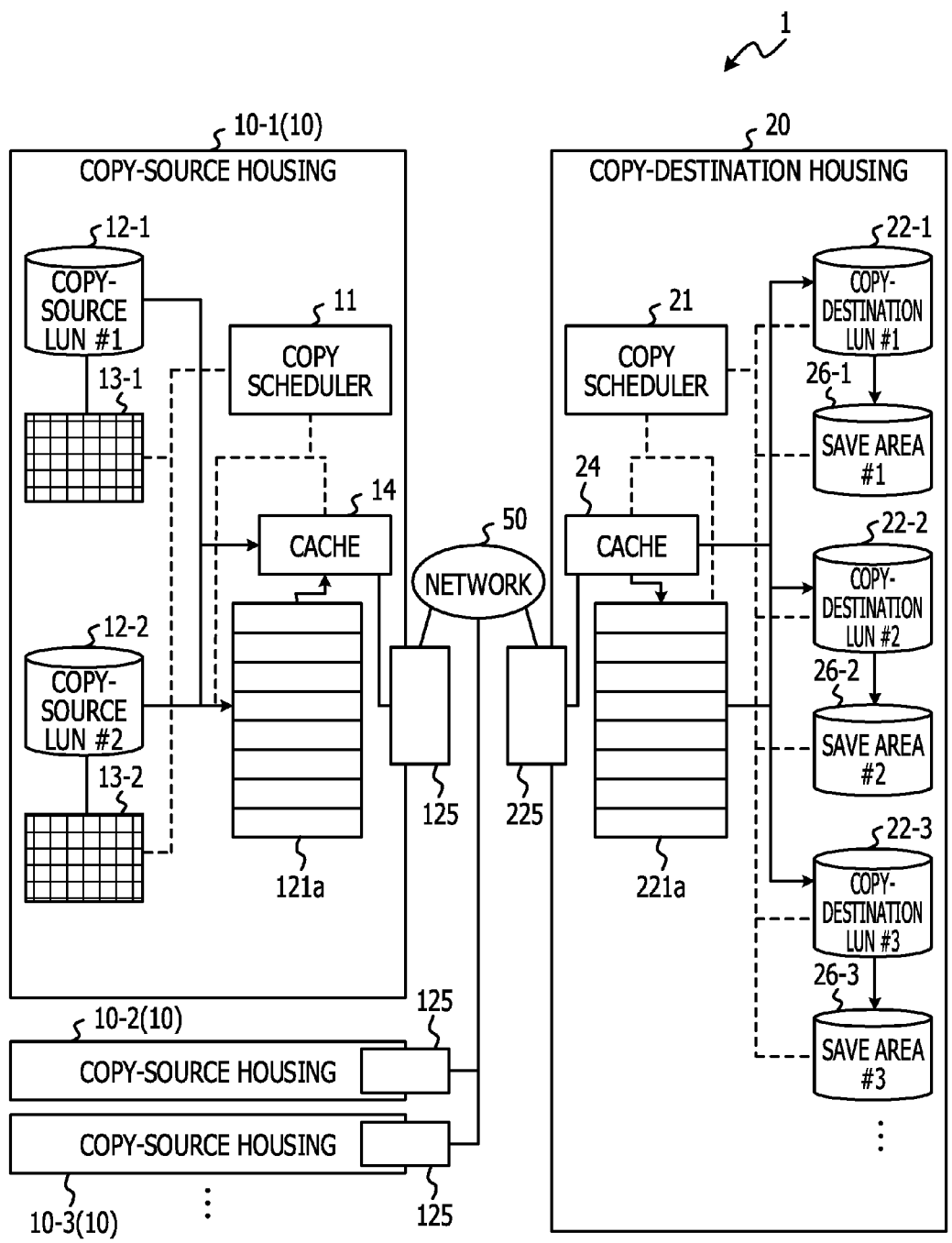
FIG. 1 is a diagram illustrating a functional configuration of a storage system according to an embodiment.
Figure 2:
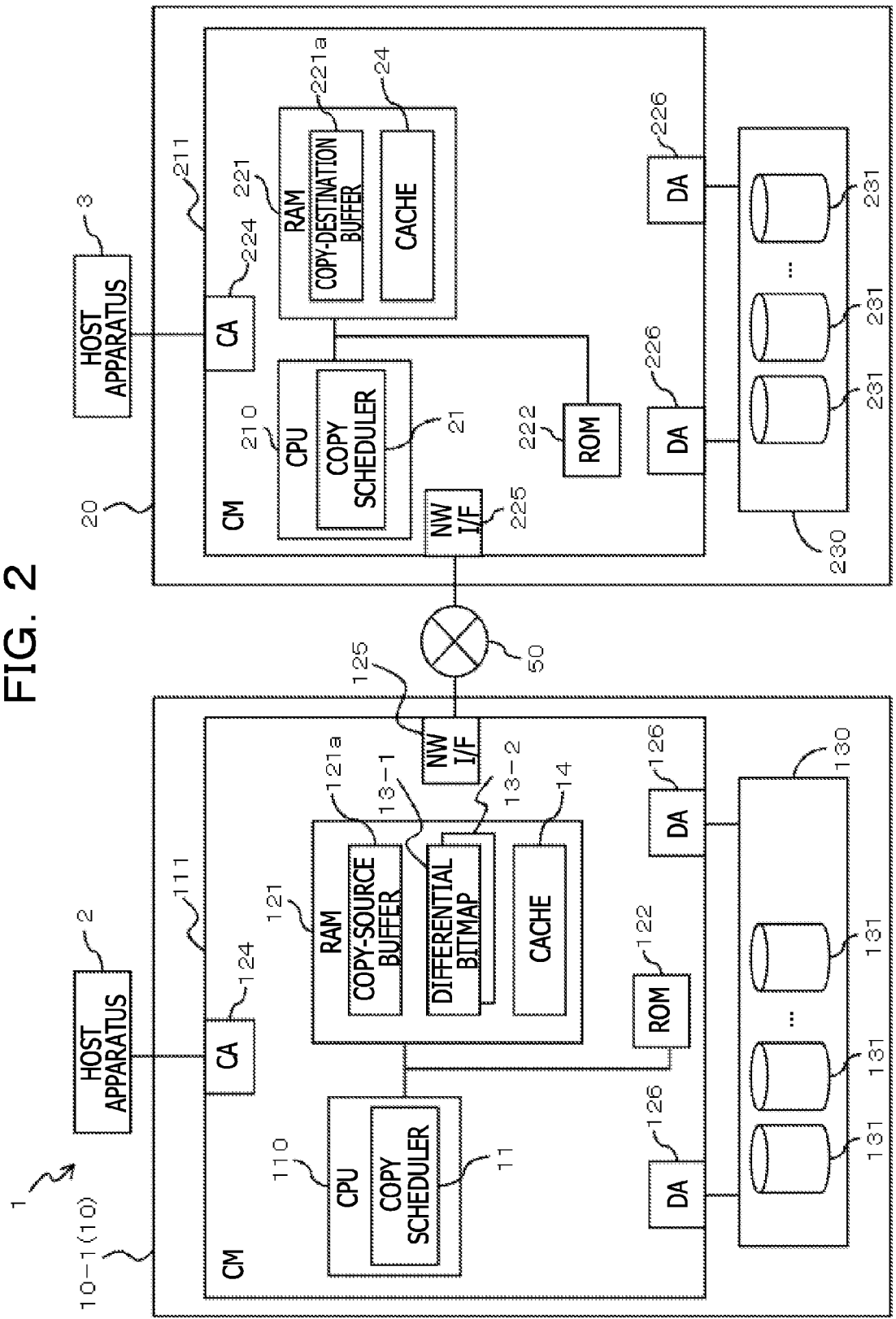
FIG. 2 is a diagram illustrating a hardware configuration of a storage system according to an embodiment.

FIG. 1 is a diagram illustrating a functional configuration of a storage system according to an embodiment. FIG. 2 is a diagram illustrating a hardware configuration of a storage system.

As depicted in FIG. 1, a storage system 1 includes a plurality (four in the example of FIG. 1) of storage apparatuses 10-1, 10-2, 10-3, and 20 communicably connected to each other via a network (NW) 50. In FIG. 2, only the configurations of the storage apparatuses 10-1 and 20 are depicted for convenience.

The network 50 is a communication line for communicating data, and implements data transfer based on, for example, standards such as transmission control protocol/internet protocol (TCP/IP) for a local area network (LAN), wide area network (WAN), or the like.

The storage apparatuses 10-1, 10-2, 10-3, and 20 provide storage areas (logical units) to host apparatuses 2 and 3, and are redundant arrays of inexpensive disks (RAID) apparatuses, for example. Logical unit numbers (LUNs) are assigned to respective logical units. Hereinafter, a logical unit may be referred to by a LUN assigned thereto. The storage apparatuses 10-1, 10-2, 10-3, and 20 each include one or more disk apparatuses 131 or 231, where data and programs are stored.

The storage system 1 has a data copy function of copying (transferring) data of volumes (logical volumes) of the storage apparatuses 10-1, 10-2, and 10-3 to the storage apparatus 20 by data transfer.

In the present embodiment, the storage apparatuses 10-1 to 10-3 are assumed to be copy-source housings (copy-source apparatuses), and the storage apparatus 20 is assumed to be a copy-destination housing (copy-destination apparatus). An example of data copying is described below in which data in the disk apparatuses 131 of the storage apparatuses 10-1, 10-2, and 10-3 is transferred to the storage apparatus 20 and stored in the disk apparatuses 231 of the storage apparatus 20.

The storage apparatuses 10-1, 10-2, and 10-3 as copy-source housings have a similar configuration.

Hereinafter, as a reference numeral indicating a storage apparatus as a copy-source housing, a relevant one of the reference numerals "10-1" to "10-3" is used when one of the plurality of storage apparatuses is to be specified, and a reference numeral "10" is used to indicate any storage apparatus.

In the example depicted in FIG. 1, only the configuration of the storage apparatus 10-1 is depicted for convenience, and the configurations of the storage apparatuses 10-2 and 10-3 are omitted.

Data transfer between the storage apparatus 10 and the storage apparatus 20 via the network 50 may be referred to as remote transfer. Also, hereinafter, the storage apparatus 10 may be referred to as a copy-source housing 10, and the storage apparatus 20 may be referred to as a copy-destination housing 20.

In an example depicted in FIG. 2, the host apparatus 2 as an upper-level apparatus is connected to the storage apparatus 10-1, and the host apparatus 3 as an upper-level apparatus is connected to the storage apparatus 20.

The host apparatuses 2 and 3 are information processing apparatuses, and are computers each including, for example, a central processing unit (CPU), a random access memory (RAM), a read-only memory (ROM), and so on (not depicted).

The host apparatus 2 writes and reads data in and from copy-source LUNs 12-1 and 12-2, which are volumes of the storage apparatus 10 connected to the host apparatus 2. For example, the host apparatus 2 makes a data access request for reading or writing to the copy-source LUNs 12-1 and 12-2, which are business volumes of the storage apparatus 10. In response to the data access request, the storage apparatus 10 performs data access to the copy-source LUNs 12-1 and 12-2 to respond to the host apparatus 2.

The host apparatus 2 creates session information for a copy session regarding the storage apparatus 10.

The session information is information about a copy session, and includes, for example, a session identifier (ID), a LUN and a start logical block address (LBA) of a copy source, and a LUN, a start LBA, and a block count (BC) of a copy destination. The session information may be created by using a scheme of related art.

The session information created by the host apparatus 2 is transmitted to the storage apparatus 10, and retained in a RAM 121 (described later) or the like of the storage apparatus 10.

While FIG. 2 depicts the state, for convenience, in which the host apparatus 2 is connected to the storage apparatus 10-1 and the host apparatus 3 is connected to the storage apparatus 20, two or more host apparatuses may be connected to each of the storage apparatuses 10 and 20.

The storage apparatuses 10 and 20 include controller modules (CMs) 111 and 211 and disk enclosures 130 and 230, respectively, as depicted in FIG. 2. The CMs 111 and 211 perform various controls in the storage apparatuses 10 and 20, respectively, such as access controls to the disk apparatuses 131 and 231 in the disk enclosures 130 and 230 according to storage access requests (access control signals) from the host apparatuses 2 and 3, respectively, which are upper-level apparatuses.

The disk enclosures 130 and 230 include one or more disk apparatuses 131 and 132, respectively. The disk apparatuses 131 and 132 are, for example, hard disk drives (HDDs). In the storage apparatuses 10 and 20, storage areas of these HDDs 131 and 231 are allocated to logical volumes.

In the example depicted in FIG. 1, the copy-source housing 10-1 includes the copy-source LUN 12-1 and the copy-source LUN 12-2 as logical volumes. Hereinafter, the copy-source LUN 12-1 may be referred to as a copy-source LUN #1, and the copy-source LUN 12-2 may be referred to as a copy-source LUN #2.

The copy-source LUNs #1 and #2 are, for example, business volumes for storing business data of the host apparatus 2. In response to a disk access request from the host apparatus 2, updating such as data write is performed. In the storage system 1, data in these copy-source LUNs #1 and #2 is a backup target to be copied. That is, the copy-source LUNs #1 and #2 function as copy-source areas for storing copy-source data.

The copy-destination housing 20 includes a copy-destination LUN 22-1, a copy-destination LUN 22-2, and a copy-destination LUN 22-3 as logical volumes. Hereinafter, the copy-destination LUN 22-1 may be referred to as a copy-destination LUN #1. Similarly, the copy-destination LUN 22-2 may be referred to as a copy-destination LUN #2, and the copy-destination LUN 22-3 may be referred to as a copy-destination LUN #3.

The copy-destination LUN #1 is a volume for use as a copy destination corresponding to the copy-source LUN #1. Data (copy-source data) in the copy-source LUN #1 is copied to and stored in the copy-destination LUN #1, as backup data. That is, the copy-destination LUN #1 functions as a copy-destination area where backup data corresponding to the data in the copy-source LUN #1 is stored.

Similarly, the copy-destination LUN #2 is a volume for use as a copy destination corresponding to the copy-source LUN #2. Data (copy-source data) in the copy-source LUN #2 is copied to and stored in the copy-destination LUN #2, as backup data. That is, the copy-destination LUN #2 functions as a copy-destination area where backup data corresponding to the data in the copy-source LUN #2 is stored.

Hereinafter, as a reference numeral for indicating a copy-source LUN, a relevant one of the reference numerals "12-1" and "12-2" or a relevant one of the numbers "#1" and "#2" is used when one of the plurality of copy-source LUNs is to be specified, and a reference numeral "12" is used to indicate any copy-source LUN.

Similarly, hereinafter, as a reference numeral for indicating a copy-destination LUN, a relevant one of the reference numerals "22-1" and "22-2" or a relevant one of the numbers "#1" and "#2" is used when one of the plurality of copy-destination LUNs is to be specified, and a reference numeral "22" is used to indicate any copy-destination LUN.

In the copy-source housing 10, one or more copy-source LUNs 12 storing data to be copied to the copy-destination housing 20 are included.

As depicted in FIG. 2, the CMs 111 and 211 include channel adaptors (CAs) 124 and 224, disc adapters (DAs) 126 and 226, network interfaces (NW I/Fs) 125 and 225, CPUs 110 and 210, ROMs 122 and 222, and RAMs 121 and 221, respectively. While the storage apparatus 10 includes one CM 111 and the storage apparatus 20 includes one CM 211 in the example depicted in FIG. 2, this is not meant to be restrictive, and the storage apparatus 10 may include two or more CMs 111 and the storage apparatus 20 may include two or more CMs 211.

The CMs 111 and 211 function as copy control apparatuses which control data copying between the storage apparatus 10 and the storage apparatus 20.

The CAs 124 and 224 are interface controllers communicably connected to the host apparatuses 2 and 3, respectively, and are fibre channel adaptors, for example.

For example, when an operator inputs, from the host apparatus 2, an instruction for copying data from the storage apparatus 10 to the storage apparatus 20, the CA 124 functions as a receiving unit which receives the instruction.

The DAs 126 and 226 are interface controllers communicably connected to the disk enclosures 130 and 230, respectively, and are Expanders or input/output (I/O) controllers using a Serial Attached Small Computer System Interface (SAS), for example.

The network interfaces 125 and 225 are interface controllers communicably connected to the other storage apparatuses 20 and 10, respectively, via the network 50, and are LAN cards or fibre channel adaptors, for example.

The RAMs 121 and 221 are memories (storage areas) which temporarily store therein various data and programs.

In predetermined areas in the RAMs 121 and 221, for example, data to be transmitted to the other storage apparatuses 20 and 10, respectively, is stored temporarily. With this, the RAMs 121 and 221 function as remote equivalent copy (REC) buffers 121a and 221a, respectively.

These REC buffers 121a and 221a are each divided into a plurality of areas for management in order to ensure ordering of data read and write processing. Each divisional area is managed as a generation.

For example, in the example depicted in FIG. 1, the REC buffers 121a and 221a each include eight areas, and these areas correspond to a first generation to an eighth generation, respectively. The generations are managed in chronological order. Each generation is freed after copy processing between the storage apparatuses 10 and 20 is completed. "Free" refers to the state in which data may be stored in a relevant generation.

Hereinafter, the REC buffer 121a may be referred to as a copy-source buffer 121a, and the REC buffer 221a may be referred to as a copy-destination buffer 221a.

The REC buffer 121a (copy-source buffer) provided in the RAM 121 temporarily stores data (update data) updated in the copy-source LUN 12. The REC buffer 121a has an area sectioned into a plurality of areas called generations as described above.

As such, the RAMs 121 and 221 function as transfer data buffer which temporarily store therein data to be transferred to the other storage apparatuses 20 and 10, respectively, at the time of remote transfer.

When data in the copy-source LUN 12 is updated by the host apparatus 2 or the like, the update data is stored in the REC buffer 121a.

Hereinafter, a scheme of data transfer from the copy-source LUN 12 to the copy-destination LUN 22 via the copy-source buffer 121a (REC buffer 121a) and the copy-destination buffer 221a (REC buffer 221a) in the storage system (copy control system) 1 is referred to as buffer transfer.

In other predetermined areas in the RAM 121, differential bitmaps (update location information) 13-1 and 13-2 are stored.

The differential bitmaps 13-1 and 13-2 indicate, in a state in which the data transfer using the REC buffer 121a is unavailable, locations updated in the copy-source LUNs #1 and #2.

The state in which the data transfer using the REC buffer 121a is unavailable is such that, for example, a line failure occurs in the network 50 or the copy-source LUN 12 is excessively updated and the free space of the REC buffer 121a is run out. In these cases, data transfer using the REC buffer 121a is not able to be performed.

Hereinafter, as a reference numeral for indicating a differential bitmap, a relevant one of the reference numerals "13-1" and "13-2" is used when one of the plurality of differential bitmaps to be specified, and a reference numeral "13" is used to indicate any differential bitmap.

A differential bitmap 13 is provided for each copy-source LUN 12. A differential bitmap 13-1 is provided correspondingly to the copy-source LUN #1, and a differential bitmap 13-2 is provided correspondingly to the copy-source LUN #2.

Specifically, the copy-source LUN 12 is sectioned to predetermined areas (unit areas), and a plurality of bits (for example, two bits) are allocated, in the differential bitmap 13, to each unit area to indicate the update state.

In storage systems of related art, one bit is allocated for each unit area, and only one of two state types "0" and "1" is taken for a relevant unit area. That is, only the presence or absence of updating is recorded.

On the other hand, in the differential bitmap 13 of the storage system 1, a plurality of bits (a bit string) are allocated to each unit area, thereby allowing information indicating how many times updating has been performed on the unit area to be recorded for each unit area.

For example, in the differential bitmap 13, consider the case in which a bit string of two bits is allocated to each unit area. In this case, for each unit area, the bit string may take any of four types of state: "00", "01", "10", and "11".

Here, for example, "00" is set if a unit area has not been updated, "01" is set if the unit area has been updated once, "10" is set if the unit area has been updated twice, "11" is set if the unit area has been updated three or more times. That is, the differential bitmap 13 stores information about the number of updates performed on the copy-source LUN 12 for each predetermined area. Hereinafter, updating of the copy-source LUN 12 may be referred to as occurrence of update.

As such, in place of associating a flag of one bit indicating the presence or absence of update in each unit area in a differential bitmap of related art, a bit string of two bits is associated in the storage system 1. That is, it may be said that the area indicating an update state in the copy-source LUN 12 in the differential bitmap 13 is extended from one bit in related art to two bits in the storage system 1. In the storage system 1, the flag area of one bit in a differential bitmap of related art is extended by multiples (in the present embodiment, doubled). A ratio of extension with respect to related art (in the present embodiment, double (200%)) is hereinafter referred to as an extension power.

Since the flag in the differential bitmap of related art has one bit, the number of bits (size) of the bit string associated with the unit area may be directly used as an extension power. This extension power is stored in advance in, for example, the RAM 121 or the disk apparatuses 131 of the copy-source housing 10.

Frequency of updating in each unit area while scanning the differential bitmap 13 once is known based on a value indicated by the bit string in the differential bitmap 13. With this, frequency of updating in each unit area is estimated. That is, it may be estimated that a unit area updated many times (more than a predetermined number of times) while scanning the differential bitmap 13 once will be updated frequently also in the future.

A copy scheduler 11 (described later), updates (counts) update count information about a relevant unit area in the differential bitmap 13 according to the update state in the copy-source LUN 12.

When data transfer using the REC buffer 121a becomes available between the copy-source LUN 12 and the copy-destination LUN 22, the copy scheduler 11 refers to the differential bitmap 13 to store transmission data in a cache 14 (described below) for transmission to the copy-destination housing 20.

The other predetermined areas in the RAMs 121 and 221 also function as caches 14 and 24 for storing data to be transmitted to the copy-destination housing 20 and data transmitted from the copy-source housing 10, respectively.

The caches 14 and 24 are provided in the copy-source housing 10 and the copy-destination housing 20, respectively. The cache (copy-source cache) 14 of the copy-source housing 10 temporarily stores therein data to be transmitted to the copy-destination housing 20. The cache (copy-destination cache) 24 of the copy-destination housing 20 temporarily stores therein data transmitted from the copy-source housing 10.

In the cache 14, data copied from the REC buffer 121a and data copied from the copy-source LUN 12 with reference to the differential bitmap 13 are stored. In order to allow the copy-destination housing 20 to determine whether the transmission data is data transmitted (buffer transfer) via the REC buffer 121a or data transmitted by using the differential bitmap 13 (bitmap processing), the data to be transmitted includes identification information. This identification information is added to, for example, a data header or the like by the copy scheduler 11.

Data (update data) updated in the copy-source LUN 12 is sequentially stored in one generations in the REC buffer 121a. After a predetermined time elapses or when one generation is completely filled with update data, the generation for storing data in the REC buffer 121a is changed, and the data stored in the generation (transmission data) is copied to the cache 14.

The transmission data copied to the cache 14 is transmitted via the network 50 to the copy-destination housing 20, is stored in a cache 24 of the copy-destination housing 20, and is then stored in the REC buffer (copy-destination buffer) 221a.

The REC buffer 221a also has an area sectioned by generation in a manner similar to that of the REC buffer 121a, and data in a generation transmitted from the REC buffer 121a is stored in the same generation. Between the copy-source housing 10 and the copy-destination housing 20, data is transferred by generation. For this reason, the transfer data does not become odd data in each generation, and data integrity in the copy-destination housing 20 is kept.

Each number of REC buffers 121a and 221a provided is as many as the number of copy sessions for which integrity is desired to be kept. For example, when two copy-source LUNs 12 are provided in the copy-source housing 10 and data integrity is desired to be kept for these two copy-source LUNs 12 together, one REC buffer 121a is shared between these two copy-source LUNs 12 to simultaneously keep integrity.

In other predetermined areas in the RAMs 121 and 221, data received from the host apparatuses 2 and 3 and data to be transmitted to the host apparatuses 2 and 3, respectively, are temporarily stored. That is, the RAMs 121 and 221 also function as buffer memories.

In other predetermined areas in the RAMs 121 and 221, data and programs are temporarily stored and loaded when the programs are executed by the CPUs 110 and 210, which will be described later.

In other predetermined area in the RAM 121, a remote transfer bitmap (not depicted) is stored. The remote transfer bitmap represents information for managing a data transfer state of a data transfer target regarding remote data transfer between the storage apparatus 10 as the copy source and the storage apparatus 20 as the copy destination.

The ROMs 122 and 222 are storage apparatuses for storing therein programs to be executed by the CPUs 110 and 210, respectively, and various data.

The CPUs 110 and 210 are processing apparatuses for performing various controls and arithmetic operations, and implement various functions by executing programs stored in the ROM 122 or the like. That is, the CPU 110 functions as the copy scheduler 11 and the CPU 210 functions as a copy scheduler 21 (refer to FIG. 1).

A copy control program for implementing the functions as the copy schedulers 11 and 12 is provided in the form of being recorded on a computer-readable recording medium such as, for example, a flexible disc, compact disc (CD) such as CD-ROM, CD-R, or CD-RW, digital versatile disc (DVD) such as DVD-ROM, DVD-RAM, DVD-R, DVD+R, DVD-RW, DVD+RW, or HD DVD, Blu-ray disc, magnetic disc, optical disc, or magneto-optical disc. A computer reads the program from the recording medium, and transfers and stores the program into an internal storage apparatus or external storage apparatus for use. Also, the program may be recorded on a storage apparatus (recording medium) such as, for example, a magnetic disc, optical disc, or magneto-optical disc and provided to the computer via a communication path.

To implement the function as the copy scheduler 11, the program stored in an internal storage apparatus (in the present embodiment, the RAM 121 or the ROM 122) is executed by a microprocessor (in the present embodiment, the CPU 110) of the computer. Here, a program recorded in a recording medium may be read and executed by the computer.

Similarly, to implement the function as the copy scheduler 21, the program stored in an internal storage apparatus (in the present embodiment, the RAM 221 or the ROM 222) is executed by a microprocessor (in the present embodiment, the CPU 110) of the computer. Here, a program recorded in a recording medium may be read and executed by the computer.

The copy scheduler 11 controls data transfer (copy) between the copy-source LUN 12 and the copy-destination LUN 22.

The copy scheduler 11 sequentially stores data updated in the copy-source LUN 12 in one generation in the REC buffer 121a. After a predetermined time elapses or when one generation is completely filled with update data, the copy scheduler 11 changes the generation for storing data and causes the data stored in the generation to be copied to the cache 14.

The transmission data stored in the cache 14 is transmitted to the copy-destination housing 20 via the network 50.

When the free space of the REC buffer 121a in the copy-source housing 10 is depleted, the copy scheduler 11 performs management by recording data update locations in the differential bitmap 13 provided for each copy-source LUN 12.

As described above, a bit string of two or more bits is allocated to the differential bitmap 13 for each unit area of the copy-source LUN 12. When an update occurs in a range of a unit area in the copy-source LUN 12, the copy scheduler 11 changes the state of a corresponding bit string. As will be described later, the copy scheduler 11 may reflect an update location of update data in the REC buffer 121a to the differential bitmap 13.

The copy scheduler 11 has a function of updating the differential bitmap 13.

Figure 3:
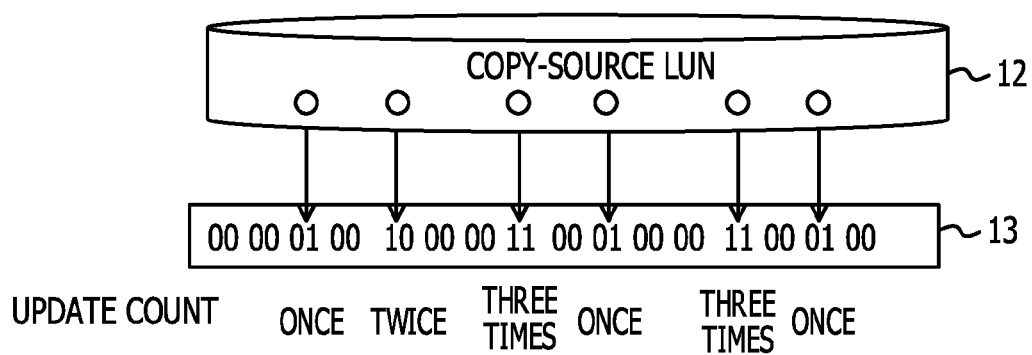
FIG. 3 is a diagram for describing a scheme for updating a differential bitmap in a storage system according to an embodiment.

FIG. 3 is a diagram for describing a scheme of updating the differential bitmap 13 in the storage system 1.

FIG. 3 depicts an example in which updates have occurred at six locations in the copy-source LUN 12 (refer to circles in FIG. 3).

When the copy-source LUN 12 is changed in a state in which the REC buffer 121a is depleted or the like, the copy scheduler 11 increments the value of each bit string corresponding to each change location in the differential bitmap 13.

That is, for example, the copy scheduler 11 changes a bit string of "00" of a target unit area in the differential bitmap 13 to "01". Similarly, the copy scheduler 11 changes a bit string of "01" for a target unit area in the differential bitmap 13 to "10", and changes a bit string of "10" to "11". However, the copy scheduler 11 does not manipulate (change) a bit string of "11" of in a target unit area in the differential bitmap 13 but keeps the state of "11".

In this manner, by associating a bit string of two bits with a unit area in the differential bitmap 13, the update count at each relevant location, such as once, twice, or three or more times, is recorded in the differential bitmap 13.

When becoming capable of transferring the data to the copy-destination housing 20, the copy scheduler 11 copies (performs data transfer of) update data in the copy-source LUN 12 only for the unit area corresponding to the bit string of "01" in the differential bitmap 13 to the copy-destination housing 20. For the unit areas corresponding to bit strings other than "01" in the differential bitmap 13, the copy scheduler 11 does not perform processing (copy processing) of transferring the data to the copy-destination housing 20.

Upon data transfer to the copy-destination housing 20, the copy scheduler 11 updates the differential bitmap 13. That is, when the bit string of the unit area subject to data transfer indicates "01" in the differential bitmap 13, the copy scheduler 11 returns the value of the bit string to "00" after data transfer processing.

For a unit area corresponding to a bit string of "10" or "11" in the differential bitmap 13, the copy scheduler 11 decrements the value of the bit string, without performing copy processing, to return the value to "01" or "10", respectively, which is a value at an immediately preceding stage. For a unit area corresponding to a bit string of "00" in the differential bitmap 13, the copy scheduler 11 neither performs copy processing nor decrements the value of the bit string.

The unit area corresponding to the bit string having a value equal to or larger than a predetermined number (for example, 2), that is, "10" or "11", may be frequently updated. Therefore, even if the data at the relevant location is transferred from the copy-source LUN 12 to the copy-destination LUN 22, there is a high probability that the data at the relevant location is further updated and data transfer is again performed.

Thus, in the storage system 1, the copy scheduler 11 transfers the data at the relevant location from the copy-source LUN 12 to the copy-destination LUN 22 only for the unit area corresponding to the bit string of "01" in the differential bitmap 13.

As for a location regarded as being frequently updated, the copy scheduler 11 only decrements the update count (the value of the bit string) in the differential bitmap 13, and deters data transfer at the relevant location. With this, repeated transmission of data in the same unit area from the copy-source LUN 12 to the copy-destination LUN 22 is reduced to decrease the number of times of copying the differential bitmap. As a result, the time for differential copying is decreased.

Figure 4A:
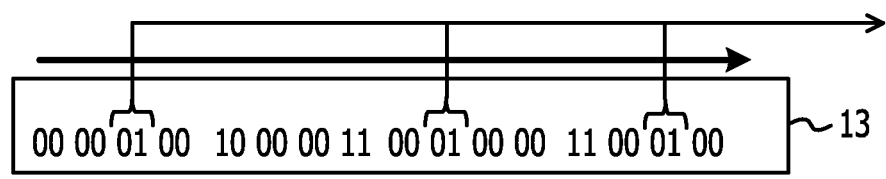
FIGS. 4A, 4B, and 4C are diagrams for describing a scheme for differential copying in a storage system according to an embodiment.
Figure 4B:
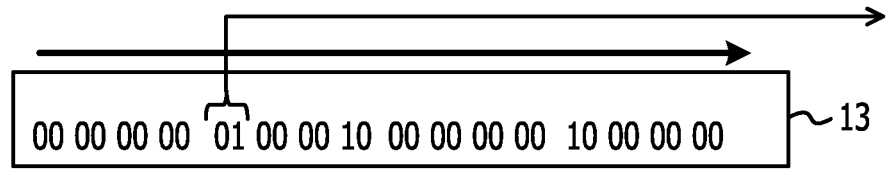
Figure 4C:
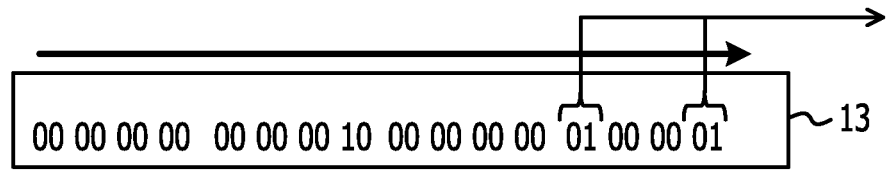

FIGS. 4A, 4B, and 4C are diagrams for describing a scheme for differential copying in a storage system. FIG. 4A depicts a first cycle, FIG. 4B depicts a second cycle, and FIG. 4C depicts a third cycle.

In differential copying, the copy scheduler 11 scans the differential bitmap 13 to detect a unit area corresponding to a bit string of "01", and transfers the data in that area in the copy-source LUN 12 to the copy-destination LUN 22. The copy scheduler 11 repeatedly performs these processes.

In the first cycle of scanning the differential bitmap 13 exemplarily depicted in FIG. 4A, for three unit areas with the value "01" of the bits string, corresponding data in the copy-source LUN 12 is transferred to the copy-destination LUN 22.

Upon data transfer to the copy-destination housing 20, the copy scheduler 11 updates the differential bitmap 13. With this, as depicted in FIG. 4B, in the second cycle, bit strings with "01" in the first cycle depicted in FIG. 4A are updated to "00", a bit string with "10" is updated to "01" and, furthermore, bit strings with "11" are updated to "10".

The copy scheduler 11 scans the differential bitmap 13 exemplarily depicted in FIG. 4B after update to detect a unit area corresponding to a bit string of "01" (in FIG. 4B, one location), and transfers the data in that area in the copy-source LUN 12 to the copy-destination LUN 22.

Upon data transfer to the copy-destination housing 20, the copy scheduler 11 updates the differential bitmap 13. With this, as depicted in FIG. 4C, in the third cycle, for example, a bit string with "01" in FIG. 4B is updated to "00", and bit strings with "10" are updated to "01".

During this period, the copy-source LUN 12 is updated by the host apparatus 2. In FIG. 4C, the copy-source LUN 12 is newly updated, and locations with bit strings in the differential bitmap 13 incremented are present.

The copy scheduler 11 repeats scanning of the differential bitmap 13, transfer of the data in the area in the copy-source LUN 12 regarding the unit area corresponding to a bit string of "01" to the copy-destination LUN 22, and updating of the differential bitmap 13.

While a bit string of two bits (twice as large as that of related art) is used for each unit area in the differential bitmap 13 in the above-described embodiment, this is not meant to be restrictive, and a bit string of three or more bits may be used. Various modifications may be made for implementation depending on, for example, the use situation of the RAM 121 or the like.

For example, in the differential bitmap 13, by allocating a bit string obtained by increasing one bit of related art fourfold (four bits) or eightfold (eight bits) to each unit area, the update count up to fifteen or 255 is recordable per unit area.

That is, in the storage system 1, the differential bitmap 13 includes a bit string obtained by extending one bit of related art by multiples (for example, doubled to two bits), and the update count of each unit area is recorded in the bit string.

The copy scheduler 11 also has a function of transferring, in the buffer transfer, the last data in a plurality of generations in the REC buffer 121a at the time of occurrence of a halt to the copy-destination housing 20. With this, the amount of data copied and saved to ensure integrity is reduced to contribute reduction in the capacity of a save area 26. Transfer of the last data in the REC buffer 121a is performed based on the amount of recorded data in the REC buffer 121a, the amount of update to the copy-source LUN 12, transmission speed in the network 50 (line speed), and so on. Details are described below.

In the storage system 1, a data transfer scheme of making the copy-source LUN 12 and the copy-destination LUN 22 equivalent to each other may be implemented by two types of operation, that is, a differential bitmap processing and a buffer priority processing, and either one of these operations is selected and performed.

Here, in the differential bitmap processing, processing of reflecting the recording area in the REC buffer 121a to the differential bitmap 13. On the other hand, in the buffer priority processing, after the data in the REC buffer 121a is transferred in advance to the copy-destination housing 20 (after this processing is performed with priority), processing of transferring the remaining data indicated by the differential bitmap 13 to the copy-destination housing 20 is performed.

Figure 5:
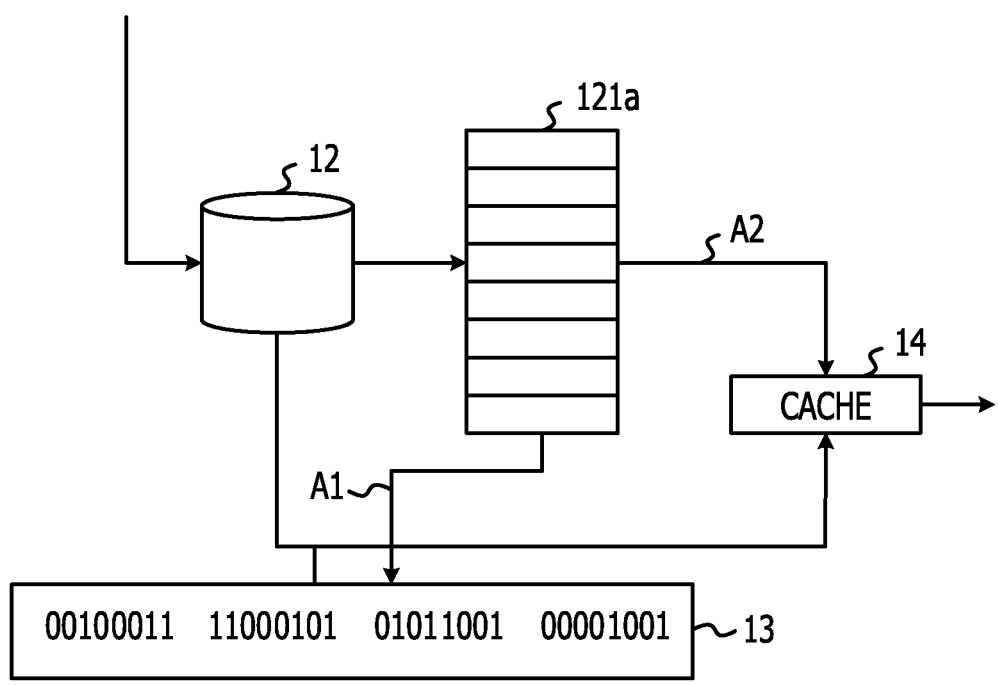
FIG. 5 is a diagram for describing how to handle data in a copy-source buffer at a time of depletion of a copy-source buffer in a storage system according to an embodiment.

FIG. 5 is a diagram for describing how to handle data in the copy-source buffer 121a at the time of depletion of the copy-source buffer 121a in the storage system 1.

In the differential bitmap processing, when the REC buffer 121a is depleted, the update location of data retained in the REC buffer 121a is referred to, and a corresponding differential bitmap 13 is generated (A1). By reflecting the update data location in the REC buffer 121a to the differential bitmap 13, switching is made to differential copying using the differential bitmap 13.

In the storage system 1, as described above, a bit string of two bits is allocated to each unit area in the differential bitmap 13. That is, since the differential bitmap is extended twofold or more compared with the differential bitmap of related art, processing of increasing the update count of the differential bitmap 13 by one is performed.

In the differential bitmap processing, the data in the REC buffer 121a is deleted after reflection to the differential bitmap 13, and the REC buffer 121a becomes usable again at the stage where the copy-source LUN 12 and the copy-destination LUN 22 become equivalent to each other.

On the other hand, in the buffer priority processing, the contents in the copy-source buffer 121a are transmitted in advance via the cache 14 to the copy-destination buffer 221a of the copy-destination housing 20 without reflecting the recording area of the copy-source buffer 121a (A2).

The data in the copy-source buffer 121a and the copy-destination buffer 221a are managed so as to have integrity for each generation. Therefore, in copying by buffer transfer, processing of saving data in the copy-destination housing 20 is not performed. That is, the save area 26 may not be used. Therefore, by reducing the transfer amount of the differential copying using the differential bitmap 13, the capacity of the save area 26 is suppressed.

Here, examples of conditions effective in reducing the capacity of the save area 26 in the buffer priority processing more than the differential bitmap processing are as follows.

(1) The update locations of data recorded in the copy-source buffer 121a and not overlapping the update locations recorded on the differential bitmap 13 is large.

For example, the condition is such that the amount of data which is recorded in the copy-source buffer 121a but whose location is not recorded as an update location on the differential bitmap 13 is half of or larger than the entire recording area of the copy-source buffer 121a. In such a case, the amount of data to be written back from the copy-source buffer 121a to the differential bitmap 13 is large, thereby increasing the area registered in the differential bitmap 13 and increasing the save area 26 in the differential bitmap processing.

(2) An increase in number of new update locations in the copy-source LUN 12 is small.

For example, when the amount of increase of new update locations is half of or smaller than the line speed of the network 50, an increase of update locations registered in the differential bitmap 13 during data transfer of the copy-source buffer 121a is small, and the amount of the save area 26 tends not to increase even if buffer transfer takes time.

(3) The line speed of the network 50 is high.

For example, when the line speed of the network 50 is twice or more as large as the amount of increase of new update locations, the time for data transfer from the copy-source buffer 121a is decreased and, accordingly, switching is made to differential copying earlier. Thus, an increase in the amount of the save area 26 is reduced.

(4) An overlap between the update locations of data recorded in the copy-source buffer 121a and the update locations recorded on the differential bitmap 13 is small.

For example, the condition is such that an area overlapping between the update locations of data recorded on the copy-source buffer 121a and the update locations recorded on the differential bitmap 13 is half of or smaller than the entire recording area of the copy-source buffer 121a. When the overlapping portion is large, much of the data copied by the buffer transfer from the copy-source buffer 121a is to be overwritten by the subsequent differential copying. On the other hand, even if the state of the copy-source buffer 121a is reflected to the differential bitmap 13, the amount of update locations recorded on the differential bitmap 13 is not much increased.

Either one of the two types of operation, that is, the differential bitmap processing and the buffer priority processing, may be selected by, for example, the operator manually. Alternatively, parameters may be gathered at the time of recovery from a halt, and the operation by which the capacity of the save area 26 is decreased may be automatically selected. As such, various modifications may be made.

Unlike normal conditions, in buffer transfer at the time of recovery from a halt state, it is desired to quickly make the copy-source LUN 12 and the copy-destination LUN 22 equivalent to each other. Thus, the data to be transferred may not be data in all generations in the copy-source buffer 121a, and only the update data to be reflected as the final result may be transferred.

FIG. 6 is a diagram illustrating exemplary recorded update locations and actually transferred locations of each generation in the copy-source buffer in the storage system 1.

In the example depicted in FIG. 6, it is assumed that interhousing copy is performed by using the copy-source buffer 121a having four generations for one LUN with areas (addresses) of 0 to 5000. As for the generations, the first generation records the oldest update, and the fourth generation records the newest update.

In FIG. 6, each horizontal line indicates a data position in the copy-source LUN 12, each dotted line indicates a location without update in the generation, and each bold solid line indicates a location with update in the generation, that is, the location of data retained in the copy-source buffer 121a in the generation.

For example, data included in the first generation of the copy-source buffer 121a is data updated at positions of 1000 to 2000 in the LUN, and data included in the second generation thereof is data updated at positions of 1500 to 3000 in the LUN after the first generation is recorded.

In the example depicted in FIG. 6, four generations are provided, and update locations (repeated update locations) overlap each other between the first generation and the second generation at positions of 1500 to 2000 (B1). This means that there are repeated updates between these two generations at the locations of 1500 to 2000. With respect to these repeated update locations, the data at 1500 to 2000 of the updated portion in the first generation is overwritten in the next second generation, and transmission thereof is useless in transferring the entire contents of the copy-source buffer 121a to set the copy-destination buffer 221a in the latest state.

Similarly, also in the third and fourth generations, data in a newer generation is prioritized and transmission of data in an older generation is deterred at the repeated update locations. With this, the amount of data to be repeatedly transmitted is reduced.

Of the data in the plurality of generations stored in the copy-source buffer 121a, the copy scheduler 11 deters transmission of data in overlapping areas in the copy-source LUN 12 except the latest data.

In FIG. 6, a row of "transfer locations" has locations from which data is to be transmitted after all in consideration of overlapping (repeated update locations) in all generations. A column of "recorded update locations in the copy-destination buffer" has data of each generation to be actually transferred to the copy-destination housing 20 in consideration of the repeated update locations.

As for the newer generation, that is, the fourth and third generations without overlapping, the entire data recorded in the copy-source buffer 121a are transferred. However, as for the second generation with overlapping with the third generation, it is evident that only transfer of part (1801 to 3000) of a portion recorded in the copy-source buffer 121a is enough. Also, in the first generation, in consideration of overlapping between the second generation and the third generation, the entire data has been rewritten, and therefore it is regarded that data to be transmitted is none.

In buffer transfer at normal conditions, data is transferred for each generation, and is reflected to the disk apparatuses 231 at the end of transfer. In using the above-described buffer transfer scheme, data of all generations are transferred, and are reflected to the disk apparatuses 231 at the time of completion of transfer. This is because, with the data at the repeated update locations not transferred, data integrity is not kept only with one generation. In the above-described buffer transfer, the save area 26 may be omitted.

While the example depicted in FIG. 1 depicts, for convenience, copying from the copy-source LUN 12 included in the copy-source housing 10-1 to the copy-destination LUN 22 of the copy-destination housing 20, this is not meant to be restrictive.

That is, the number of copy-source housing 10 is not restricted to one, and the embodiment is targeted also for the configuration in which copy sessions with a plurality of copy-source housings 10 as copy sources are created for one copy-destination housing 20. In this case, the copy-destination LUNs 22 are provided as many as a total number of copy-source LUNs 12 of the copy sessions created from the respective copy-source housings 10. In the copy-destination housing 20, the save area 26 is provided for each copy session.

Figure 7:
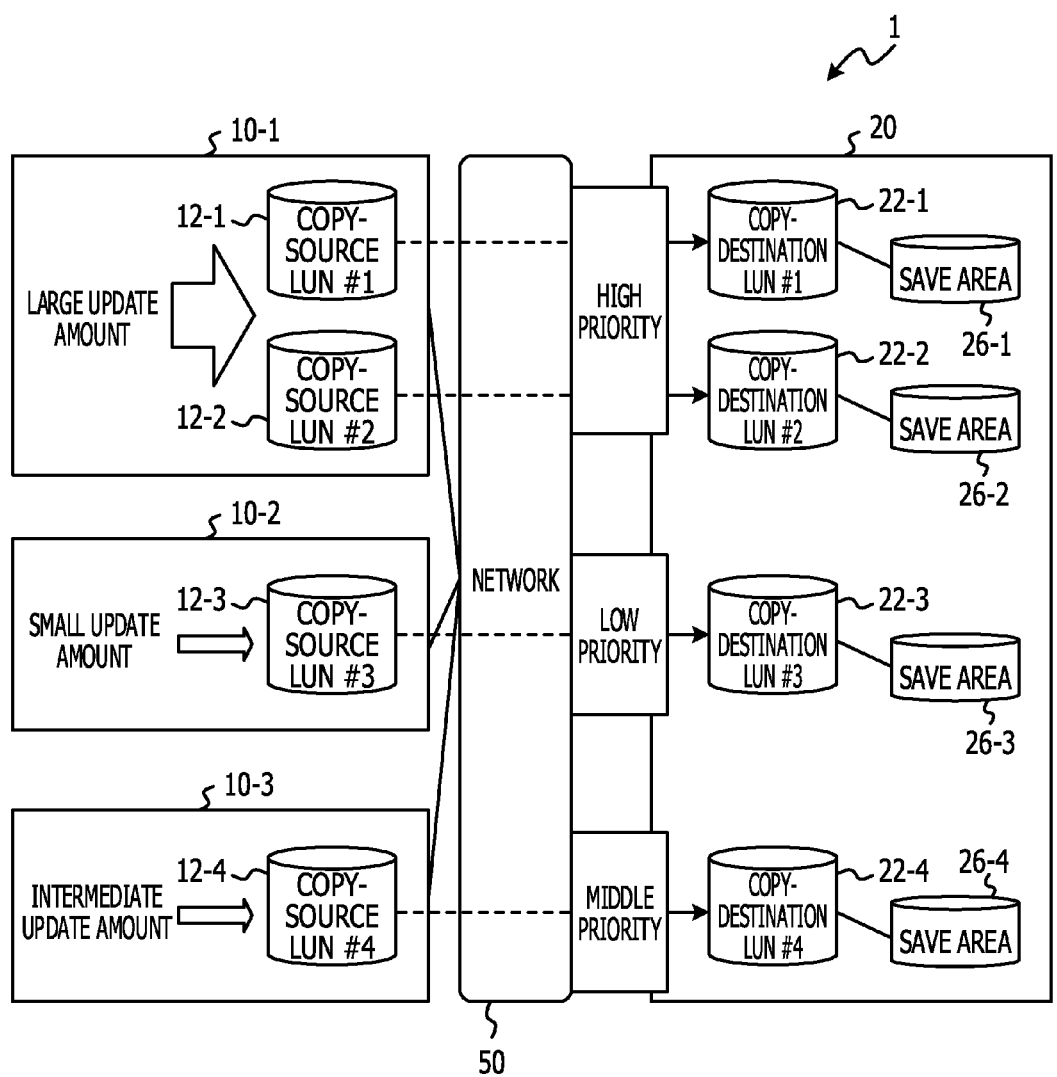
FIG. 7 is a diagram illustrating an example in which differential copying is performed from a plurality of copy-source housings to a copy-destination housing in a storage system according to an embodiment.

FIG. 7 is a diagram illustrating an example in which differential copying is performed from a plurality of copy-source housings 10 to the copy-destination housing 2 in the storage system 1.

In the example depicted in FIG. 7, copy sessions are set from three copy source housings 10-1 to 10-3 toward one copy-destination housing 20.

Between the copy-source housing 10-1 and the copy-destination housing 20, copies from two copy-source LUNs 12-1 and 12-2 are made, and these two copy-source LUNs 12 have integrity together.

Between the copy-source housing 10-2 and the copy-destination housing 20, one copy is made from the copy-source LUN 12-3. Between the copy-source housing 10-3 and the copy-destination housing 20, one copy is made from the copy-source LUN 12-4.

It is assumed that the copy-source housings 10-1 to 10-3 do not have a relation of integrity. That is, copy sessions set from the respective copy-source housings 10 are independent from each other.

As depicted in FIG. 7, when differential copying of the copy sessions between the plurality of (in the example depicted in FIG. 7, three) copy-source housings 10 and the copy-destination housing 20 are simultaneously performed, a priority level (weight) is set for each copy-source housing 10 (for each session) based on the update amount in each copy-source LUN 12, the line speed of the network 50, and so on.

In the storage system 1, of the differential copying from the plurality of copy-source housings 10, differential copying from the copy-source housing 10 with a high priority level is prioritized. Specifically, as will be described further below, in the storage system 1, differential copying from the copy-source housing 10 with a high priority level is prioritized by increasing the data transfer amount and frequency, compared with differential copying from the copy-source housing 10 with a low priority level.

With this, by prioritizing differential copying in which the copy-source housing 10 and the copy-destination housing 20 are to be made equivalent at an early stage, equivalence is established in this differential copying earlier than other differential copying.

In the example depicted in FIG. 7, in the copy-source housing 10-1, the copy-source LUNs 12-1 and 12-2 are updated frequently (large update amount), and the update amount in the copy-source LUN 12-3 of the copy-source housing 10-2 is small (small update amount). Also, it is assumed that the update amount in the copy-source LUN 12-4 of the copy-source housing 10-3 is intermediate therebetween (intermediate update amount).

Three copy-source housings 10-1, 10-2, and 10-3 connected to the copy-destination housing 20 are set with priority levels of "high", "low", and "intermediate", respectively, at the time of recovery from a halt state according to the update amount. That is, priority levels (weights) of 1, 3, and 2 are set to these three copy-source housings 10-1, 10-2, and 10-3, respectively.

In this state, when the storage system 1 is recovered from all of the halt states and differential copying works for each copy session, save areas 26-1 to 26-4 are created for respective copy-destination LUNs 22-1 to 22-4.

When the number of copy sessions increases, many save areas 26 are created according to these copy sessions. In a copy session, the update amount in the copy-source LUN 12 and the capacity for the save area 26 have a correlation.

That is, while the capacity for the save area 26 tends not to increase for a copy session with a small update amount in the copy-source LUN 12, the capacity for the save area 26 tends to increase for a copy session with a large update amount. Since the capacity for the save area 26 in the copy-destination housing 20 is a total save area 26 allocated for differential copying in each copy session, a copy session with a large amount of increasing capacity of the save area 26 is desirably processed as early as possible.

In the storage system 1, before performing differential copying, the copy scheduler 21 of the copy-destination housing 20 obtains information such as the update amount and the line speed from each copy-source housing 10. Based on the obtained information, the copy scheduler 21 determines a priority level for each copy-source housing 10, and transmits data transfer condition information corresponding to the determined priority level to each copy-source housing 10.

The data transfer condition information indicates data transfer parameters for use at the time of data transfer, and include, for example, a data transfer amount and frequency. The data transfer amount is a value indicating a line speed usable in the network 50 for use in data transfer and represents, for example, a usable percentage of a maximum line speed, which is an upper limit of the line speed. That is, the data transfer amount indicates a percentage of the upper-limit value of the line speed of the network 50 permitted to be used in data transfer from the copy-source housing 10 to the copy-destination housing 20. The frequency is the number of times the data transfer is performed in a predetermined period. In differential copying, as for data transfer from the copy-source housing 10 to the copy-destination housing 20, an upper-limit value (maximum frequency) of the number of times of data transfer in a predetermined period is set in advance. The frequency indicates a percentage of the maximum frequency permitted to be used as a data transmission count in data transfer from the copy-source housing 10 to the copy-destination housing 20.

FIG. 8 is a diagram illustrating an exemplary priority setting table in the storage system 1.

The copy scheduler 21 refers to the priority setting table as exemplarily depicted in FIG. 8 to determine a priority level of a copy session, and reads a data transfer amount and frequency according to the priority level. The priority setting table is stored in advance in, for example, the RAM 221, the disk apparatuses 231, or the like of the copy-destination housing 20.

For example, the priority level of the copy-source housing 10 having the copy-source LUN 12 with a large update amount within upper 20% of all copy-source housings 10 is set high (priority level: high). Also, the priority level of the copy-source housing 10 having a high line speed via the network 50 with the copy-destination housing 20 within upper 20% of all copy-source housings 10 is set high (priority level: high).

As for the copy-source housing 10 with a high priority level as described above, an upper-limit value of the line speed of the network 50 between the copy-source housing 10 and the copy-destination housing 20 is set as a data transfer amount, and data transmission is permitted at this upper-limit value of the line speed.

Also, as for the copy-source housing 10 with a high priority level as described above, the value of a maximum frequency is set as a frequency for data transfer from the copy-source housing 10 to the copy-destination housing 20, and data transmission is permitted at this maximum frequency.

The copy scheduler 21 refers to the priority setting table to determine a data transfer amount and frequency for each copy-source housing 10, and notifies each copy-source housing 10 of the determined values.

The copy-source housing 10 performs data transmission onward with the specified data transfer amount and frequency (data transfer condition information).

That is, in the storage system 1, for the copy session with a high priority level, differential copying is performed at speed as high as possible by increasing the transfer amount and frequency. On the other hand, for the copy session with a low priority level, the transfer amount and frequency are decreased or, in some cases, equivalence processing itself is paused, thereby prioritizing a line band and equivalence processing for the copy session with a high priority level.

Balancing priority levels set to the respective copy sessions may be attained by, for example, the operator manually setting a priority level to each copy session. Alternatively, parameters may be gathered at the copy-destination housing 20 at the time of recovery from a halt, and a priority level may be set so that the total save area 26 is more decreased. As such, various modifications may be made.

When the priority levels are manually set in advance to the plurality of copy-source housings 10 or when no priority levels are set, data transfer is performed with a data transfer amount and frequency specified in advance. For example, when no priority levels are set, data transfer is performed at the upper-limit line speed (maximum speed value) and maximum frequency, which are default values, and data is transferred from any copy-source housing 10 according to the processing speed and line speed irrespectively of priority.

Figure 9:
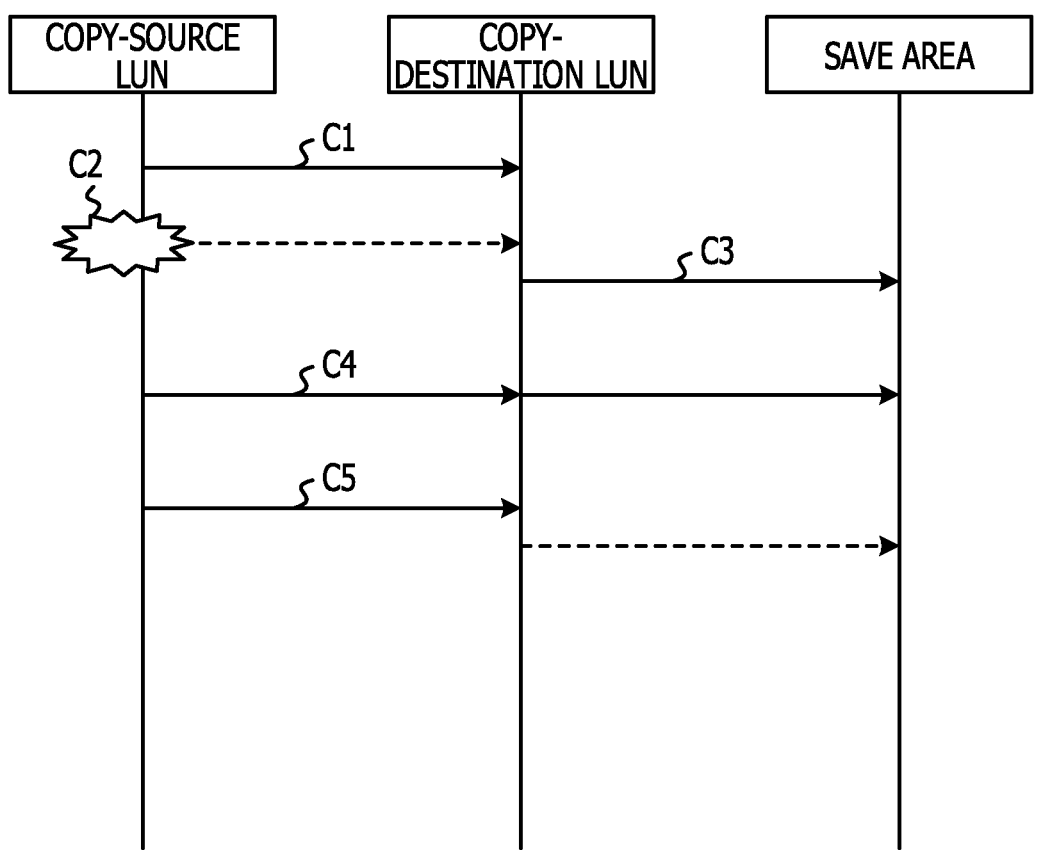
FIG. 9 is a sequence diagram illustrating processing at a time of occurrence of halt in a storage system according to an embodiment.

The processing at the time of occurrence of a halt in the storage system 1 configured as described above is described according to a sequence diagram depicted in FIG. 9. FIG. 9 depicts processing when a halt occurs for a copy session with inter-housing integrity between the copy-source housing 10 and the copy-destination housing 20 being kept.

A copy session is set between the copy-source LUN 12 and the copy-destination LUN 22 (C1). Then, it is assumed that, because of a route blockage, overload on I/O, or the like, the copy-source buffer 121a is depleted and a halt occurs (C2).

In preparation for subsequent differential copying, the copy-destination LUN 22 prepares for copying data currently stored in the copy-destination buffer 221a to the save area 26 (C3). Subsequently, until a halt event is solved, the update locations of the copy-source LUN 12 are recorded in the differential bitmap 13.

When the halt event is solved, the copy scheduler 11 refers to the contents of the copy-destination buffer 221a and the update locations in the differential bitmap 13 to perform differential copying (C4). Here, a data portion with integrity in the copy-destination LUN 22 is copied to the save area 26 before updated with data transmitted from the copy-source LUN 12.

Although the copy-destination LUN 22 does not have data integrity in itself while differential copying is performed, data with integrity before copying is recovered by bringing a data portion before copying, which is retained in the save area 26.

Therefore, even if the copy-source LUN 12 is damaged due to a disaster or the like while differential copying is being performed, the data saved in the save area 26 is written back to the copy-destination LUN 22, thereby recovering the data with integrity.

When differential copying is completed and a copy session is restarted (C5), integrity of data is kept again in the copy-destination LUN 22. Thus, data before copying in the save area 26 becomes useless, and therefore a data saving process ends to clear the data in the save area 26.

The processing from the occurrence of a halt (C2) to the restart of the copy session (C5) is repeatedly performed every time a halt event occurs.

Next, the processing of the copy-source housing 10 at the time of occurrence of a halt in the storage system 1 is described with reference to a flowchart (S101 to S106) depicted in FIG. 10.

When the copy-source buffer 121a is depleted and a halt state occurs, the processing of updating the differential bitmap 13 is started at S101. Details of the processing of updating the differential bitmap 13 will be described later with reference to FIG. 11.

Next, at S102, it is checked whether the transfer operation from the copy-source buffer 121a is set as being automatically selected. That is, it is checked whether selection of the transfer operation from the copy-source buffer 121a is performed automatically or manually. Whether selection of the transfer operation from the copy-source buffer 121a is performed automatically or manually is set in advance, and is stored as a parameter in the RAM 121 or the disk apparatuses 131.

When the buffer transfer operation is set as being automatically selected (YES at S102), an overlapping amount between the recorded locations in the copy-source buffer 121a and the recorded locations in the differential bitmap 13 is measured at S103. At S104, an update amount in the copy-source LUN 12 is measured.

At S106, it is determined whether the state has been recovered from a halt state. If the state has not been recovered (NO at S106), the procedure returns to S101. Whether the state has been recovered from a halt state is checked by a scheme of related art, and is not described herein.

On the other hand, when selection of the transfer operation from the copy-source buffer 121a is not set as being automatically performed (NO at S102), it is checked at S105 whether priority assignment to the plurality of copy-source housings 10 is set as being automatically performed.

If priority assignment is set as being automatically performed (YES at S105), the procedure proceeds to S104. As such, even if selection of the transfer operation from the copy-source buffer 121a is set as being manually performed, when priority assignment to the plurality of copy-source housings 10 is set as being automatically performed, the update amount in the copy-source LUN 12 is measured. When priority assignment is not set as being automatically performed (NO at S105), the procedure proceeds to S106.

Figure 12:
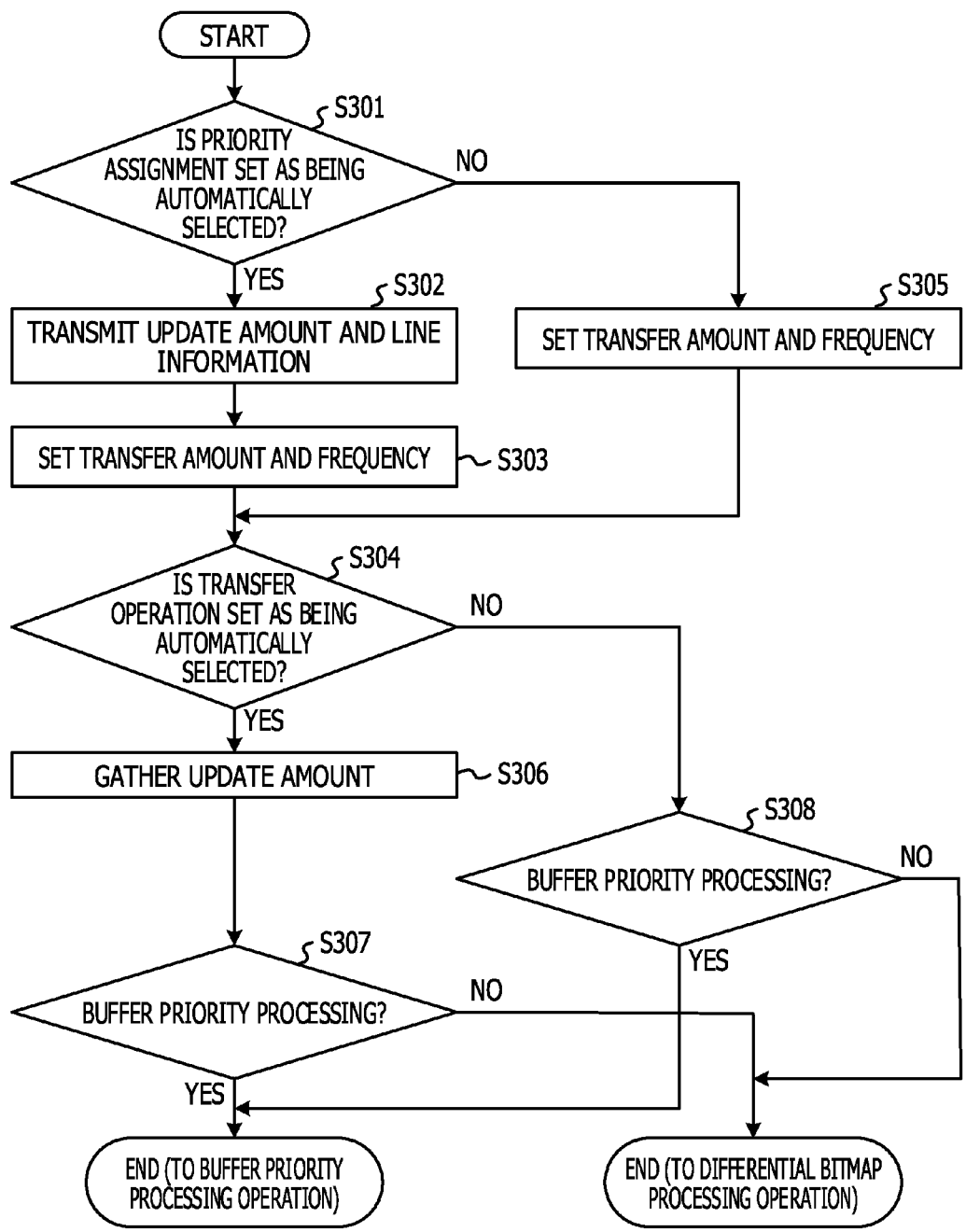
FIG. 12 is a flowchart illustrating equivalence processing of a copy-source housing in a storage system according to an embodiment.

If the state has been recovered from a halt state (YES at S106), the processing ends, and the procedure proceeds to equivalence processing, which will be described later with reference to a flowchart of FIG. 12.

Figure 11:
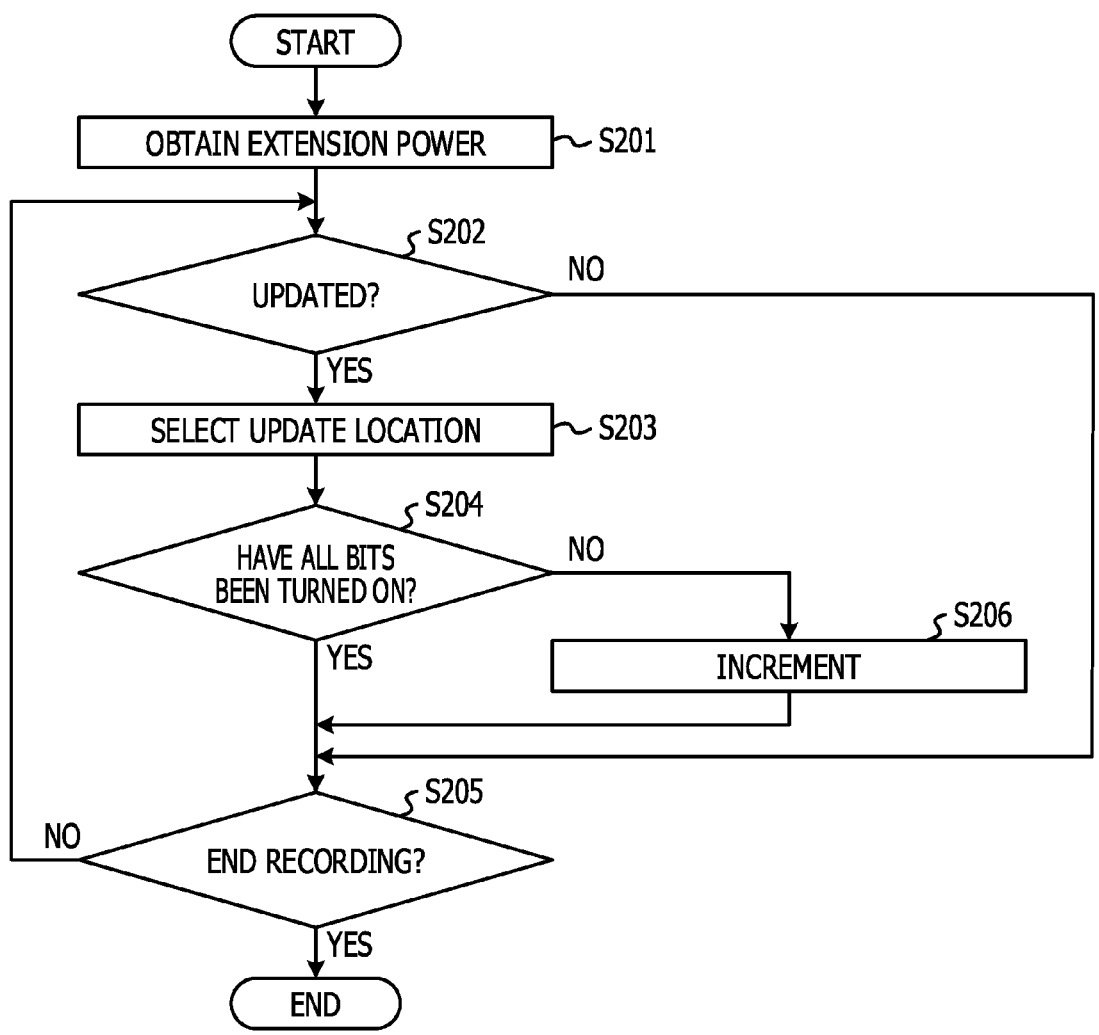
FIG. 11 is a flowchart illustrating a scheme for updating a differential bitmap in a storage system according to an embodiment.

Next, a scheme of updating the differential bitmap 13 in the storage system 1 is described with reference to a flowchart (S201 to S206) depicted in FIG. 11.

At S201, the copy scheduler 11 reads and obtains the extension power of the differential bitmap 13 from the RAM 121 or the disk apparatuses 131.

At S202, the copy scheduler 11 checks whether the copy-source LUN 12 has been updated. If the copy-source LUN 12 has been updated (YES at S202), the copy scheduler 11 selects (reads) a bit string corresponding to the unit area updated in the differential bitmap 13 according to the extension power at S203.

At S204, the copy scheduler 11 checks whether all bits have been set to "1" in the bit string, which is read at S203, indicating update count information regarding the target area. For example, when the extension power is "2", the copy scheduler 11 checks whether the value of the bit string corresponding to the updated unit area is "11" in the differential bitmap 13.

If at least one bit in the bit string is set to "0" (NO at S204), the copy scheduler 11 increments the value of the bit string by 1 at S206, and then the procedure proceeds to S205.

If all bits are set to "1" in the bit string (YES at S204), the copy scheduler 11 checks at S205 whether an instruction for ending recording in the differential bitmap 13 is provided. If all bits in the bit string are set to "1", the recorded update count has reached its upper limit, and therefore is not further incremented.

When the copy-source LUN 12 is not updated (NO at S202), the procedure skips S203, S204, and S206 to proceed to S205.

When an instruction for ending recording in the differential bitmap 13 is not provided (NO at S205), the procedure returns to S202.

When an instruction for ending recording in the differential bitmap 13 is provided (YES at S205), the procedure ends. That is, the processing of updating the differential bitmap 13 continues until an instruction for ending recording in the differential bitmap 13 at the time of completion of differential copying is provided.

Next, equivalence processing in the copy-source housing 10 in the storage system 1 is described with reference to a flowchart (S301 to S308) depicted in FIG. 12. Equivalence processing in the copy-destination housing 20 will be described later with reference to a flowchart depicted in FIG. 16.

Figure 10:
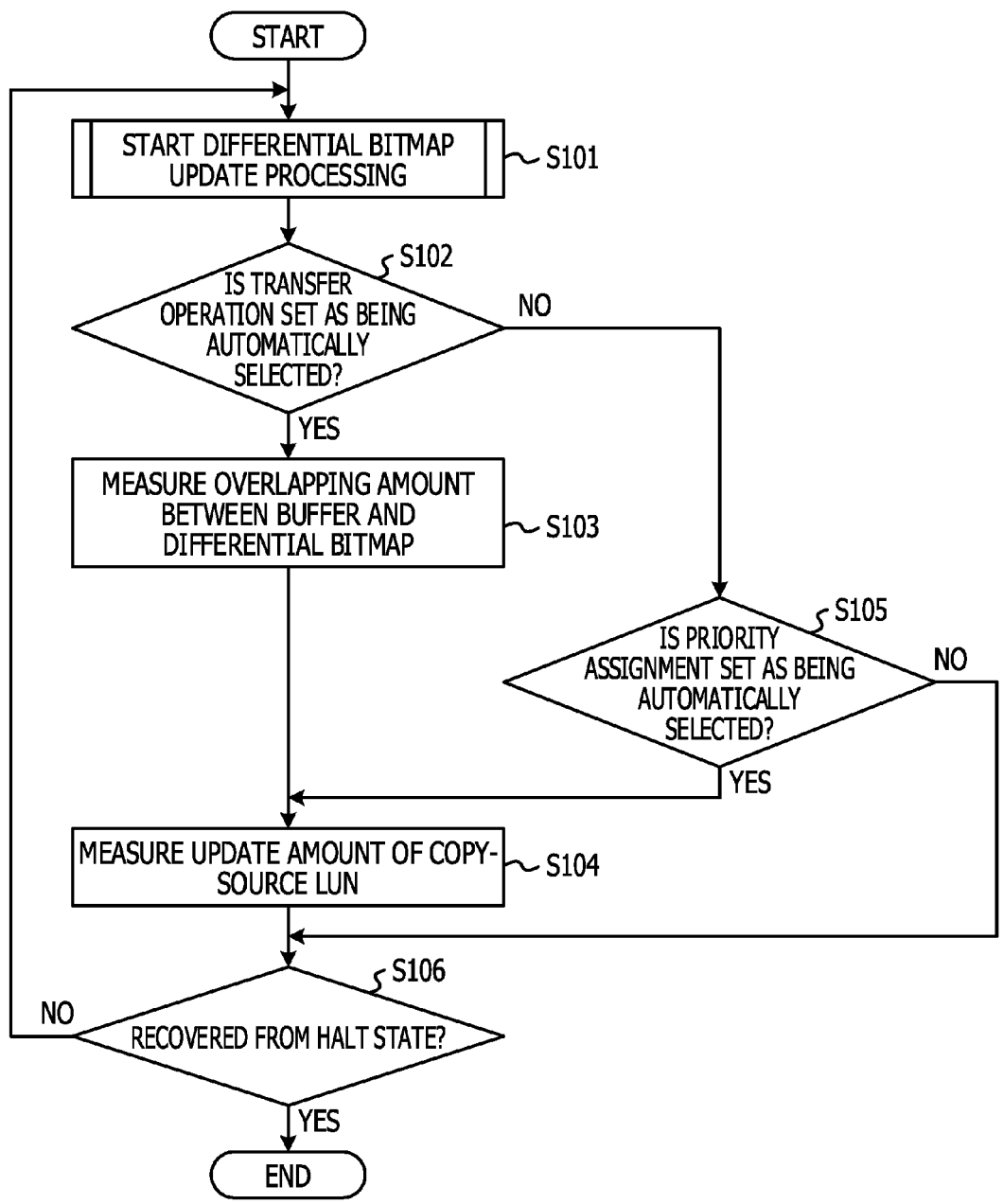
FIG. 10 is a flowchart illustrating processing of a copy-source housing at a time of occurrence of halt in a storage system according to an embodiment.

When the state is recovered from a halt state depicted in FIG. 10, the operation during the halt ends, and equivalence processing between the copy-source LUN 12 and the copy-destination LUN 22 is started.

First at S301, the copy scheduler 11 checks whether priority assignment to the plurality of copy-source housings 10 is set as being automatically selected.

When priority assignment to the plurality of housings is set as being automatically selected (YES at S301), communication is performed between the copy-source housing 10 and the copy-destination housing 20. Then at S302, the copy scheduler 11 transmits, to the copy-destination housing 20, information such as the update amount in the copy-source LUN 12 of the copy-source housing 10 and the line speed for communication with the copy-destination housing 20. In the copy-destination housing 20, the copy scheduler 21 determines a priority level based on the information received from the copy-source housing 10, and determines data transfer condition information (data transfer amount and frequency) according to the priority level, and transmits the data transfer condition information to the copy-source housing 10.

At S303, the copy scheduler 11 stores (sets) the data transfer amount and frequency received from the copy-destination housing 20. Thereafter, the copy-source housing 10 performs data transmission to the copy-destination housing 20 according to the set data transfer amount and frequency.

At S304, the copy scheduler 11 checks whether a transfer operation of the copy-source buffer 121a is set as being automatically selected.

When the buffer transfer operation is set as being automatically set (YES at S304), the copy scheduler 11 gathers the update amount in the copy-source buffer 121a at S306. Based on the gathered information and the information obtained through measurement, the copy scheduler 11 then selects either one of the differential bitmap processing and the buffer priority processing according to predefined criteria. For example, the copy scheduler 11 selects one of the differential bitmap processing and the buffer priority processing in which the capacity for the save area 26 is smaller.

It is checked (S307) whether the buffer priority processing is selected as a result of automatic selection at S306. As a result of this check, when the buffer priority processing is selected (YES at S307), the processing ends, and the procedure proceeds to the buffer priority processing, which will be described later with reference to a flowchart of FIG. 13. When the buffer priority processing is not selected (NO at S307), the processing ends, and the procedure proceeds to the differential bitmap processing, which will be described later with reference to a flowchart of FIG. 14.

When priority assignment to the plurality of housings is not set as being automatically selected (NO at S301), the copy scheduler 11 sets, at S305, the data transfer amount and frequency specified in advance, and the procedure then proceeds to S304.

When the buffer transfer operation is not set as being automatically selected (NO at S304), it is checked at S308 whether the buffer priority processing has been selected by the operator or the like.

Figure 13:
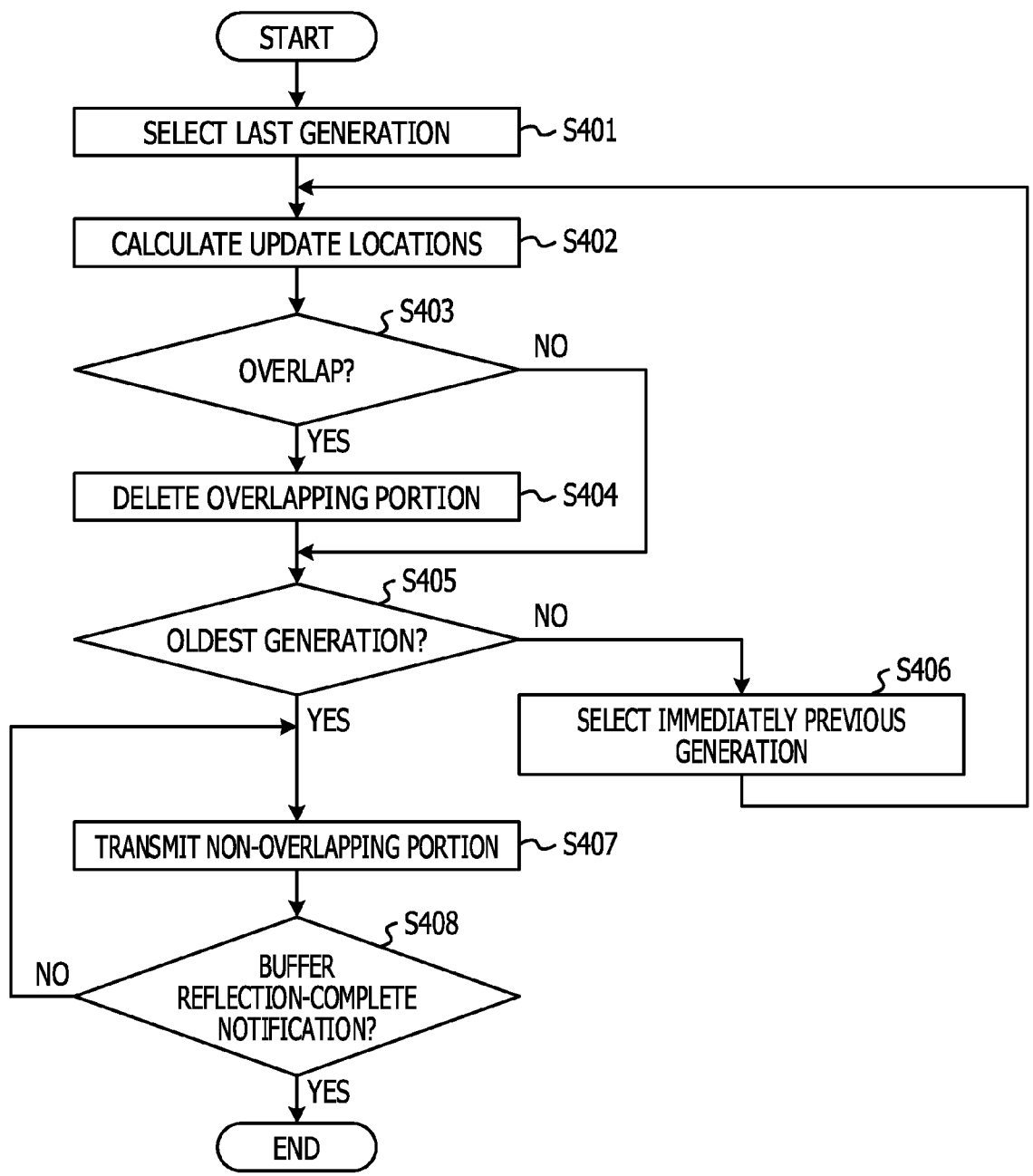
FIG. 13 is a flowchart illustrating processing of a copy-source housing in a buffer priority processing in a storage system according to an embodiment.

As a result of this check, when the buffer priority processing has been manually selected (YES at S308), the processing ends, and the procedure proceeds to the buffer priority processing, which will be described later with reference to a flowchart of FIG. 13. When the buffer priority processing has not been selected (NO at S308), the processing ends, and the procedure proceeds to the differential bitmap processing, which will be described later with reference to a flowchart of FIG. 14.

That is, the buffer priority processing is performed if the buffer priority processing has been manually selected, and the differential bitmap processing is performed without gathering information if the buffer transfer operation is not set as being automatically selected and the buffer priority processing has not been manually selected.

Next, the processing of the copy-source housing 10 in the buffer priority processing in the storage system 1 is described with reference to the flowchart (S401 to S408) depicted in FIG. 13.

First at S401, the copy scheduler 11 selects the last generation of the copy-source buffer 121a. Next at S402, the copy scheduler 11 calculates and reads positions (update locations) in the copy-source LUN 12 of the data included in the generation selected at S401.

The copy scheduler 11 calculates and reads update locations of each generation before the generation selected at S402. Then at S403, the copy scheduler 11 compares the update locations in the generation selected at S402 and the update locations in each generation before the generation selected at S402 to check whether overlapping portions are present.

When the update locations in the generation selected at S402 and the update locations in each generation before the generation selected at S402 overlap each other (YES at S403), the overlapping portion is deleted from the update locations at S404. Specifically, by deleting the overlapping portion from the update locations for each generation before the generation selected at S402, the buffer data in subsequent generations do not overlap each other.

For example, in the left column (recorded update locations in the copy-source buffer) in FIG. 6 which exemplarily depicts the recorded update locations and actual transfer locations of each generation in the copy-source buffer 121a, the update locations of 900 to 1800 of the third generation overlap (repeated update locations) the update locations of 1500 to 3000 of the second generation prior to the third generation and the update locations of 1000 to 2000 of the first generation prior to the third generation.

The copy scheduler 11 deletes, from update locations of 1500 to 3000 of the second generation, repeated locations of 1500 to 1800 which overlap the update locations of 900 to 1800 of the third generation, and generates update locations of 1801 to 3000 as recorded update locations of the second generation in the copy-destination buffer. Similarly, the copy scheduler 11 deletes, from update locations of 1000 to 2000 of the first generation, repeated locations of 1000 to 1800 which overlap the update locations of 900 to 1800 of the third generation, and generates update locations of 1801 to 2000 as recorded update locations of the first generation in the copy-destination buffer. The update locations of 1801 to 2000 generated as the recorded update locations of the first generation in the copy-destination buffer are deleted as repeated locations which overlap the update locations of 1801 to 3000 of the second generation, when the processing at S403 and S404 is performed for the second generation.

When the update locations of the generation selected at S402 and the update locations of the generation before the generation selected at S402 do not overlap each other (NO at S403), the procedure skips S404 to proceed to S405.

At S405, it is checked whether the selected generation is the oldest generation in the copy-source buffer 121a. When the selected generation is not the oldest generation (NO at S405), an immediately previous generation is selected at S406, and the procedure then proceeds to S402 to read update locations in that generation.

When the selected generation is the oldest generation (YES at S405), no repeated update locations are present among the plurality of generations of the data in the copy-source buffer 121a. At S407, such data of all generations without repeated update locations in the copy-source buffer 121a is transmitted via the cache 14 to the copy-destination buffer 221a. Here, the copy scheduler 11 transmits the data by inserting, into a header or the like of the data to be transmitted from the copy-source housing 10, an identifier indicating that the data is transmitted from the copy-source buffer 121a.

In the copy-destination housing 20, the received data of each generation in the copy-source buffer 121a is stored in each generation of the copy-destination buffer 221a provided for each generation. In the copy-destination housing 20, when the data transmitted from the copy-source housing 10 is completely stored in the copy-destination buffer 221a, the data in the copy-destination buffer 221a is reflected to the copy-destination LUN 22. When the reflection of the data in the copy-destination buffer 221a to the copy-destination LUN 22 is completed, the copy-destination housing 20 transmits a buffer reflection-complete notification to the copy-source housing 10. This processing in the copy-destination housing 20 will be described later with reference to FIG. 17.

In the copy-source housing 10, the copy scheduler 11 checks at S408 whether a buffer reflection-complete notification has been received from the copy-destination housing 20. If not received (NO at S408), the procedure returns to S407. Upon confirming that a buffer reflection-complete notification has been received from the copy-destination housing 20 (YES at S408), the copy scheduler 11 regards that the buffer transfer has been completed, and starts processing of data transfer based on the differential bitmap 13.

Figure 14:
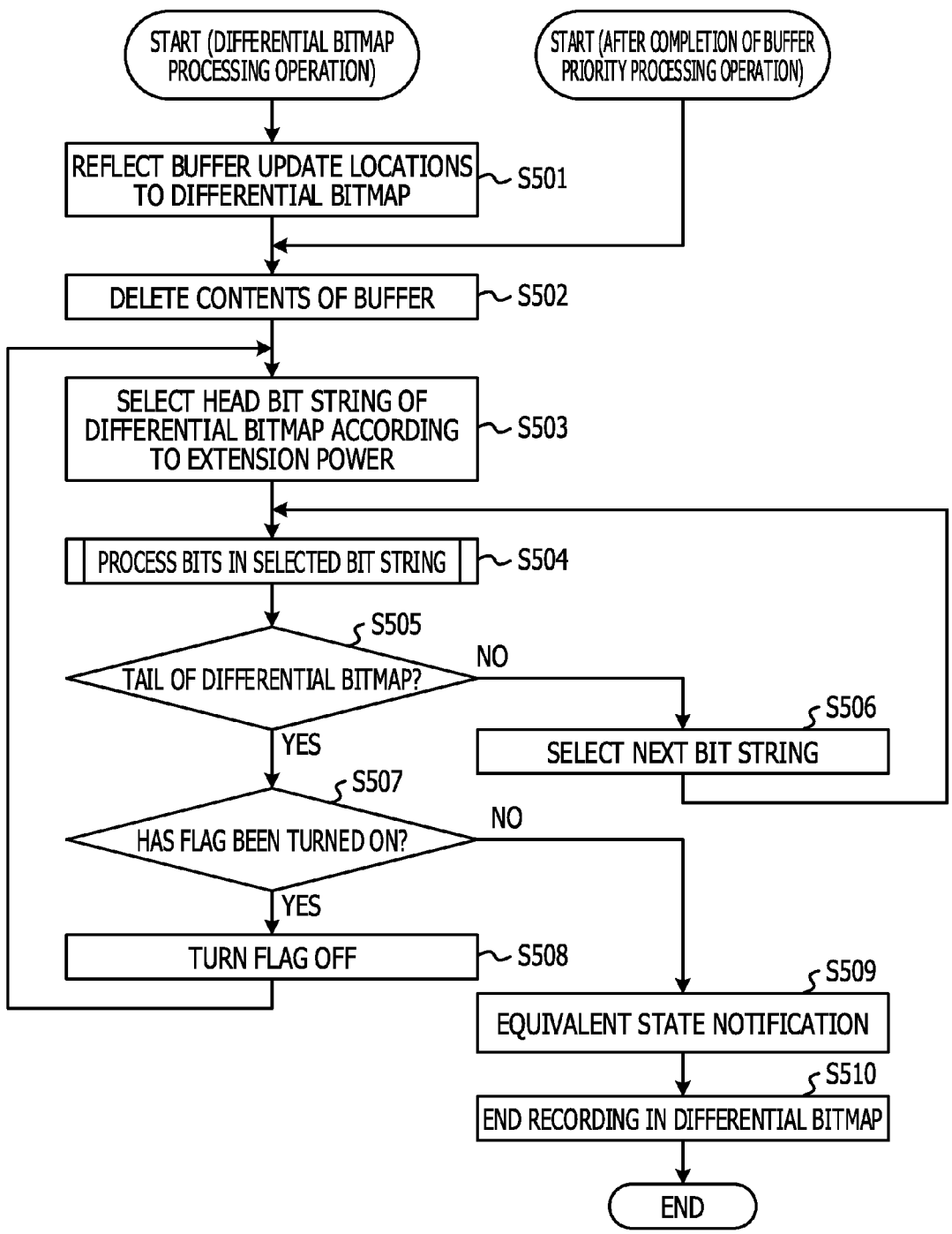
FIG. 14 is a flowchart illustrating processing of a copy-destination housing after completion of a differential bitmap processing or a buffer priority processing in a storage system according to an embodiment.

Next, the processing in the differential bitmap processing or after the completion of the buffer transfer in the copy-source housing 10 in the storage system 1 is described with reference to the flowchart (S501 to S510) of FIG. 14.

In the differential bitmap processing, at S501, the copy scheduler 11 first reflects the data update locations based on the information in the copy-source buffer 121a to the differential bitmap 13.

On the other hand, after the completion of the buffer transfer, since this is after the data in the copy-source buffer 121a is transmitted, reflection to the differential bitmap 13 is not performed (S501 is skipped), and the procedure starts from S502.

The copy scheduler 11 deletes and clears the contents of the copy-source buffer 121a at S502. Thereafter, the copy scheduler 11 selects the head bit string of the differential bitmap 13 according to extension power at S503.

Figure 15:
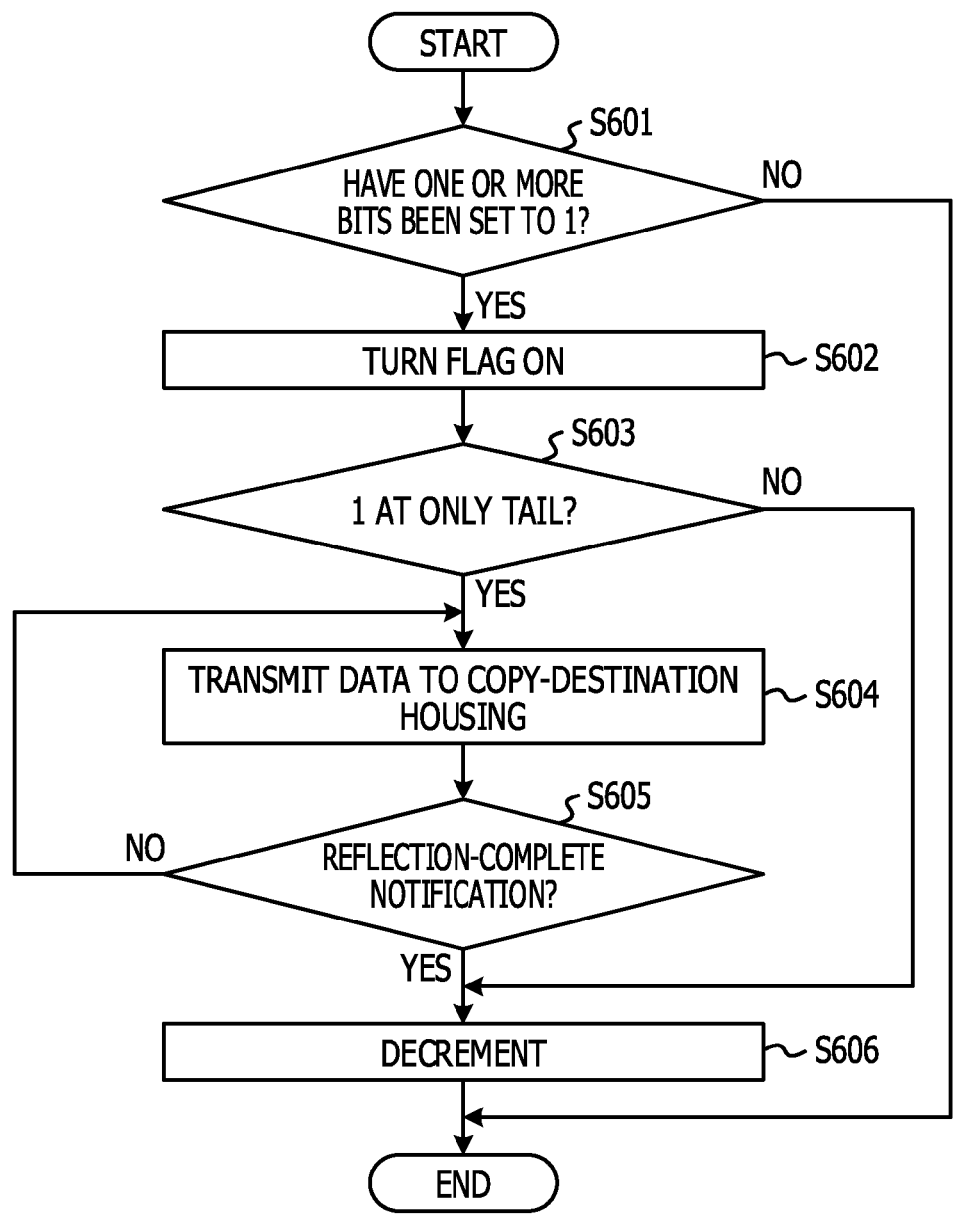
FIG. 15 is a flowchart illustrating bit processing in a storage system according to an embodiment.

At S504, the copy scheduler 11 processes the bits in the selected bit string. Here, this bit processing on the selected bit string at S504 is described with reference to a flowchart (S601 to S606) depicted in FIG. 15.

At S601, the copy scheduler 11 checks whether one or more bits in the selected bit string have been set to "1". If one or more bits in the selected bit string have been set to "1" (YES at S601), the copy scheduler 11 sets, for example, "1" to a cycle repeat flag in a predetermined area of the RAM 121 at S602.

The cycle repeat flag represents information indicating presence or absence of update points in the differential bitmap 13. For example, if "1" is set to the cycle repeat flag, this indicates that at least one update point is present at this moment in the differential bitmap 13.

To make the copy-source LUN 12 and the copy-destination LUN 22 equivalent to each other, the copy scheduler 11 continues data transfer until no update point is left to be reflected to the copy-destination LUN 22. Thus, when an update point in the differential bitmap 13 is present, "1" is set to the cycle repeat flag.

The copy scheduler 11 checks whether only the tail of the selected bit string is "1" at S603.

When only the tail of the selected bit string is "1" (YES at S603), the number of updates in the corresponding unit area (update count information) is 1, and the unit area is regarded as an area with a low update frequency. Thus, at S604, the copy scheduler 11 copies the data of the unit area from the copy-source LUN 12 to the cache 14, and then transmits the data to the copy-destination housing 20. Here, the copy scheduler 11 transmits the data by inserting, into the transmission data, an identifier indicating that the data is transmitted based on the differential bitmap 13.

In the copy-destination housing 20, the unit area specified in the copy-destination LUN 22 is updated with the received data according to the information in the received data. Upon the completion of reflection of the received data to the copy-destination LUN 22, the copy-destination housing 20 transmits a reflection-complete notification to the copy-source housing 10. This processing in the copy-destination housing 20 will be described later with reference to FIG. 17.

In the copy-source housing 10, the copy scheduler 11 checks at S605 whether a reflection-complete notification regarding the transmission data has been received from the copy-destination housing 20. If not received (NO at S605), the procedure returns to S604. Upon confirming that a reflection-complete notification regarding the transmission data has been received from the copy-destination housing 20 (YES at S605), the copy scheduler 11 decrements the value of the selected bit string in the differential bitmap 13 by 1 at S606. Then, the process ends, and the procedure proceeds to S505 in FIG. 14.

At S505, the copy scheduler 11 checks whether the selected bit string is at the tail of the differential bitmap 13. When the selected bit string is not at the tail of the differential bitmap 13 (NO at S505), the copy scheduler 11 selects the next bit string at S506, and then the procedure returns to S504.

When the selected bit string is at the tail of the differential bitmap 13 (YES at S505), the copy scheduler 11 checks the cycle repeat flag at S507.

When "1" is set to the cycle repeat flag (YES at S507), the copy scheduler 11 sets "0" to the cycle repeat flag at S508, and the procedure returns to S503, performing bit processing again from the head bit string in the differential bitmap 13.

When "1" is not set to the cycle repeat flag (NO at S507), it is regarded that the copy-source LUN 12 and the copy-destination LUN 22 are equivalent to each other. The copy scheduler 11 notifies the copy-destination housing 20 at S509 that the copy-source LUN 12 and the copy-destination LUN 22 are in an equivalent state. At S510, the copy scheduler 11 ends recording in the differential bitmap 13, and returns to a normal copy state.

Figure 17:
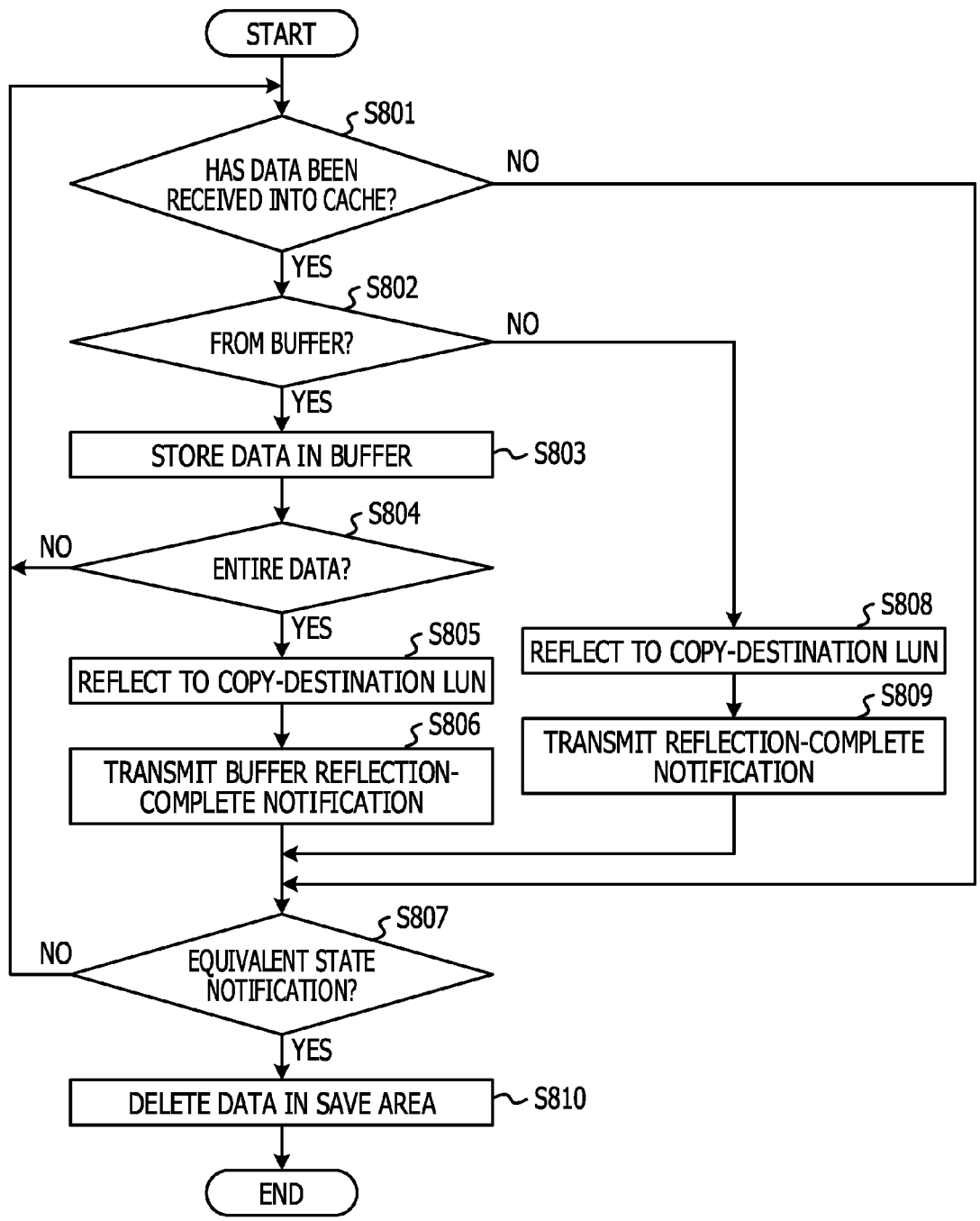
FIG. 17 is a flowchart illustrating processing of a copy-destination housing in a storage system according to an embodiment.
Figure 18:
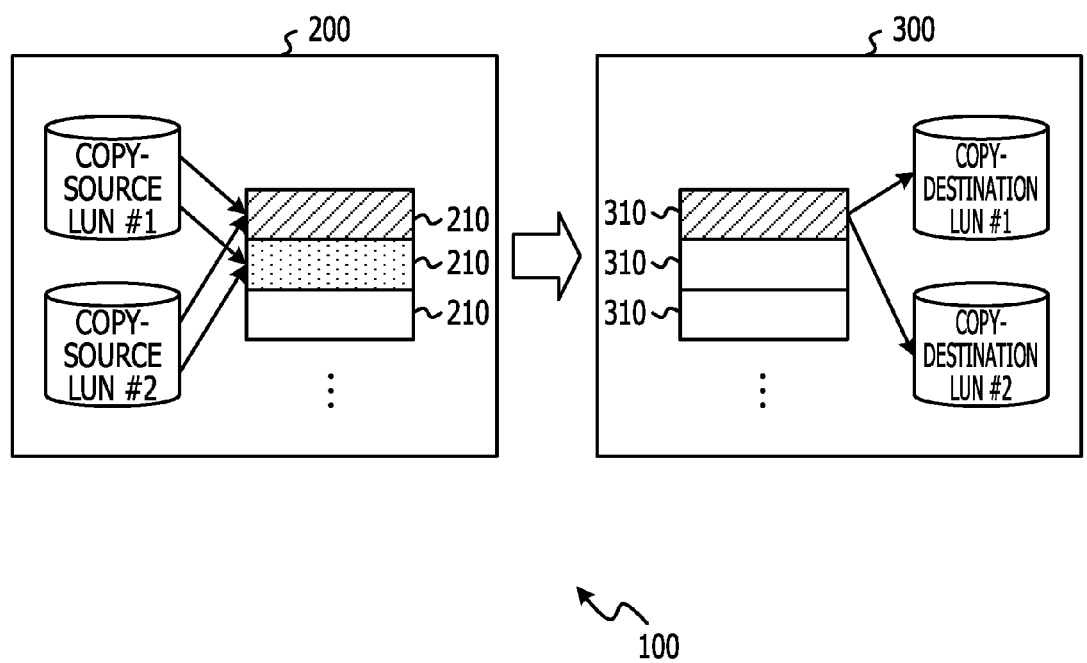
FIG. 18 is a diagram illustrating an inter-housing copying scheme of related art.
Figure 19:
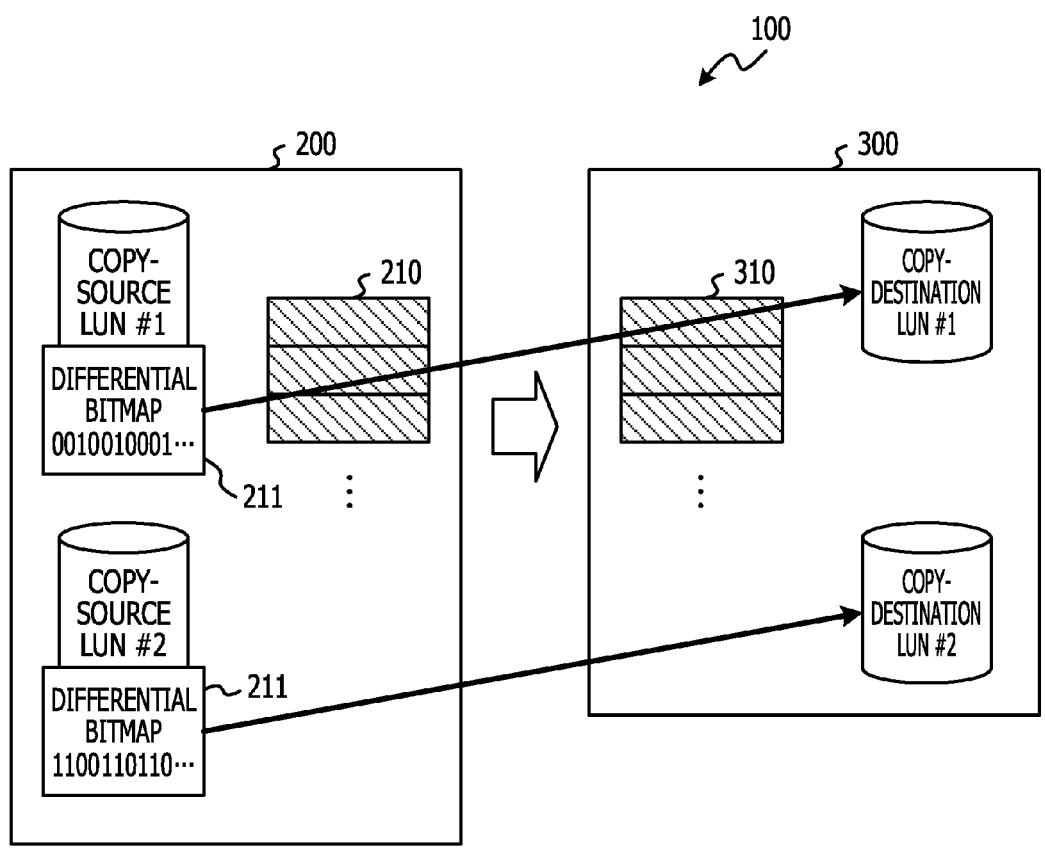
FIG. 19 is a diagram illustrating an inter-housing copying scheme of related art.
Figure 20:
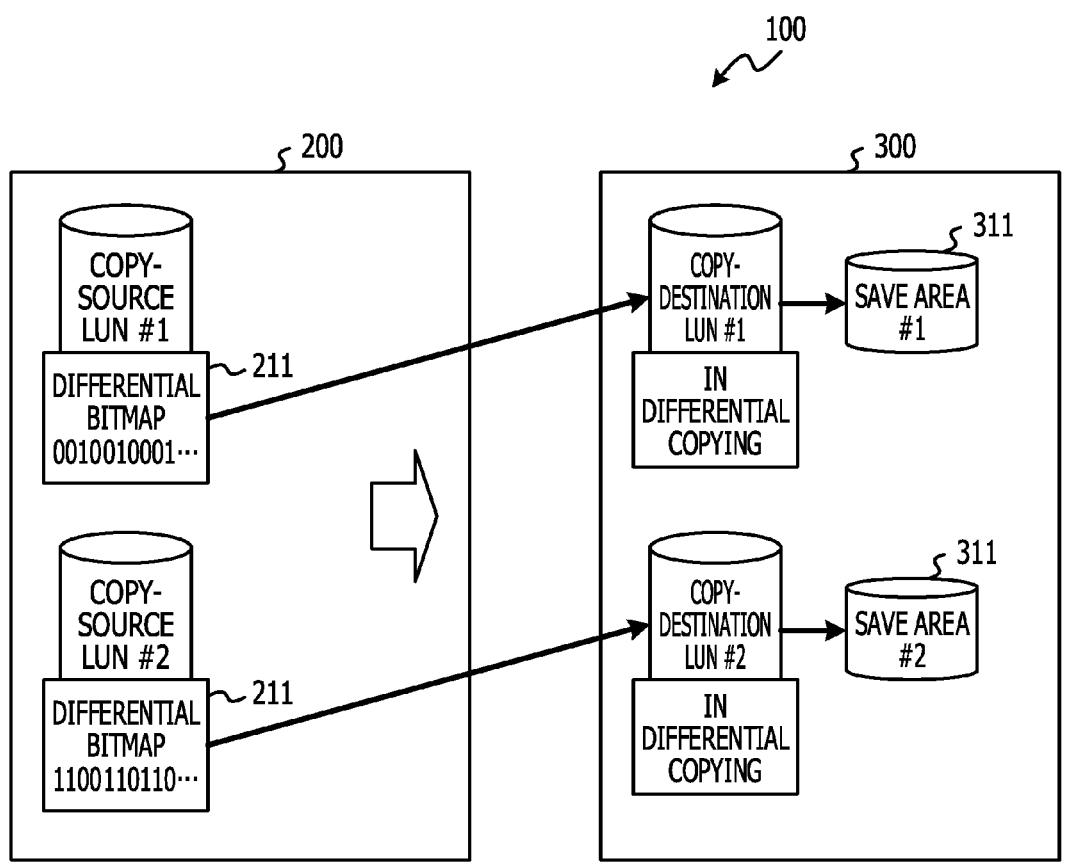
FIG. 20 is a diagram illustrating an inter-housing copying scheme of related art.

Also in the copy-destination housing 20, as will be described later with reference to FIG. 17, when an equivalent state notification comes from the copy-source housing 10, the equivalence processing ends, and the state returns to a normal copy state. The data before copying in the save area 26 is useless, and therefore deleted.

Figure 16:
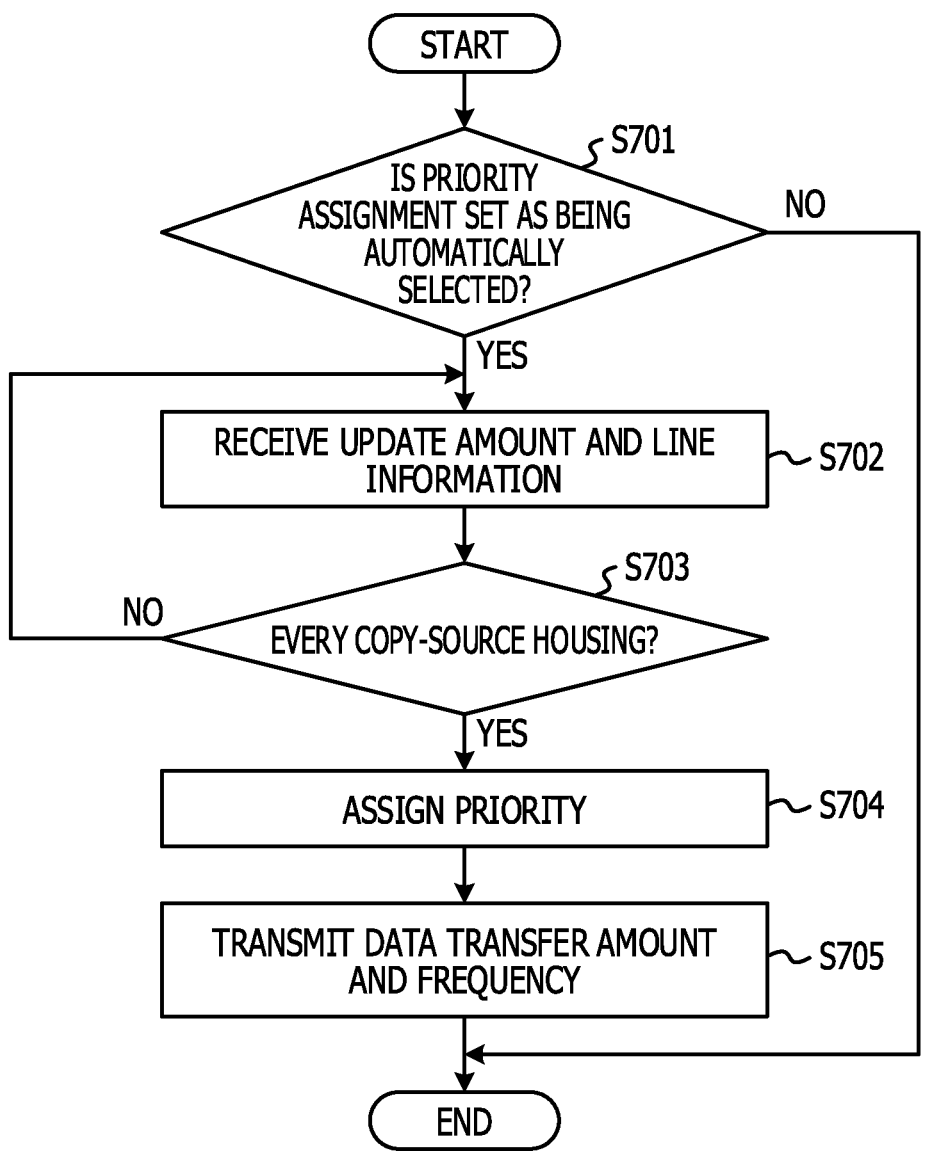
FIG. 16 is a flowchart illustrating equivalence processing of a copy-destination housing in a storage system according to an embodiment.

Next, the equivalence processing in the copy-destination housing 20 in the storage system 1 is described with reference to the flowchart (S701 to S705) depicted in FIG. 16.

At S701, the copy scheduler 21 checks whether priority assignment to a plurality of copy-source housings 10 is set as being automatically selected.

Here, when priority assignment to the plurality of copy-source housings 10 is not set as being automatically selected (NO at S701), the processing ends.

When priority assignment to the plurality of copy-source housings 10 is set as being automatically selected (YES at S701), communication is performed between each copy-source housing 10 and the copy-destination housing 20 at S702, and the copy-destination housing 20 receives the update amount and the line information from each copy-source housing 10.

At S703, it is checked whether the information (for example, the data update amount and line information) is received from every copy-source housing 10. If the information is not received from some copy-source housings 10 (NO at S703), the procedure returns to S702, collecting information again.

If the information has been received from every copy-source housing 10 (YES at S703), a priority level for each copy session of each copy-source housing 10 is determined at S704 based on the information (the data update amount and line information) received at S702. Then at S705, based on the determined priority level, the copy scheduler 21 refers to the above-described priority setting table (refer to FIG. 8) to determine a data transfer amount and frequency, transmits the determined data transfer amount and frequency to each copy-source housing 10, and ends the processing. In the copy-source housing 10, subsequent data is processed with the data transfer amount and frequency specified for each copy-source housing 10.

Next, the processing in the copy-destination housing 20 in the storage system 1 is described with reference to a flowchart (S801 to S810) depicted in FIG. 17.

First at S801, the copy scheduler 21 checks whether data has been received from the copy-source housing 10 into the cache 24.

If data has been received from the copy-source housing 10 into the cache 24 (YES at S801), the copy scheduler 21 refers to the identifier of the received data and checks at S802 whether the received data is transmitted via the copy-source buffer 121a.

When the received data is transmitted via the copy-source buffer 121a (YES at S802), the copy scheduler 21 stores the received data in the specified generation of the copy-destination buffer 221a at S803. That is, the copy scheduler 21 stores the received data in a generation of the copy-destination buffer 221a corresponding to the generation of the copy-source buffer 121a.

The above-described processing continues until the data in the copy-source buffer 121a is entirely stored in the copy-destination buffer 221a. That is, at S804, the copy scheduler 21 checks whether the data in the copy-source buffer 121a has been entirely stored in the copy-destination buffer 221a.

If the data in the copy-source buffer 121a has not entirely been stored in the copy-destination buffer 221a (NO at S804), the procedure returns to S801.

If the data in the copy-source buffer 121a has entirely been stored in the copy-destination buffer 221a (YES at S804), the copy scheduler 21 reflects the data in the copy-destination buffer 221a to the copy-destination LUN 22 (the copy-destination LUN 22 is updated with the data in the copy-destination buffer 221a) at S805.

After the update data in the copy-destination buffer 221a is reflected, data with integrity is retained in the copy-destination LUN 22. With this, the copy scheduler 21 directly writes data in the copy-destination LUN 22 without saving data in the save area 26. Thus, the capacity for the save area 26 is not increased in this processing.

After reflection of the entire data in the copy-destination buffer 221a to the copy-destination LUN 22 is completed, the copy scheduler 21 transmits a buffer reflection-complete notification to the copy-source housing 10 at S806.

On the other hand, when the received data is not transmitted via the copy-source buffer 121a (NO at S802), the received data is transmitted based on the differential bitmap 13. At S808, the copy scheduler 21 reflects the received data to the specified area in the copy-destination LUN 22 (updates the copy-destination LUN 22 with the received data). At this time, the copy scheduler 21 also saves the data in the update target area of the copy-destination LUN 22 into the save area 26.

Then at S809, the copy scheduler 21 transmits a reflection-complete notification regarding the transmission data to the copy-source housing 10.

Then at S807, the copy scheduler 21 checks whether an equivalent state notification has been received from the copy-source housing 10. If the equivalent state notification has not been received from the copy-source housing 10 (NO at S807), the procedure returns to S801. If the equivalent state notification has been received from the copy-source housing 10 (YES at S807), the copy scheduler 21 deletes the data in the save area 26 to end the processing at S810.

If data has not been received from the copy-source housing 10 into the cache 24 (NO at S801), the procedure proceeds to S807.

As such, according to the storage system 1, by extending one-bit flags in the differential bitmap 13 as bit strings of two or more bits, the number of updates for each unit area is recorded in the differential bitmap 13.

The copy scheduler 11 refers to the number of updates indicated by the bit strings in the differential bitmap 13 and transfers, by differential copying, only the data of a portion with a low update frequency, that is, with the number of updates equal to or smaller than a predetermined value (for example, equal to 1), from the copy-source housing 10 to the copy-destination housing 20. As for a portion with a high update frequency, that is, with the number of updates larger than the predetermined value, data transmission (differential copying) from the copy-source LUN 12 to the copy-destination LUN 22 is deterred, and the number of updates in the differential bitmap 13 is decremented only.

With this, the time for differential copying using the differential bitmap 13 is reduced, and the amount of update to be performed on the copy-source LUN 12 during differential copying is decreased, thereby reducing data to be saved in the save area 26. Therefore, the capacity of the save area 26 may be reduced.

In differential copying using the differential bitmap 13 in the storage system 1, data only in the unit area corresponding to the bit string of "01" in the differential bitmap 13 is transferred to the copy-destination LUN 22. With this, the size (data amount) of areas to be copied in an inter-housing copy session is reduced, thereby reducing the time for differential copying. Therefore, eventually, the volume capacity actually allocated for the save area 26 to keep integrity of the copy-destination LUN 22 may be reduced.

By reducing the time for differential copying, the size of the area to be copied in an inter-housing copy session from the copy-source housing 10 to the copy-destination housing 20 is reduced. With this, eventually, the capacity actually allocated in the save area 26 to keep integrity of the copy-destination LUN 22 may be reduced.

By extending one-bit flags in the differential bitmap 13 to bit strings of two or more bits, the number of updates manageable for each unit area may be increased.

Furthermore, by performing the buffer priority processing of transferring data in the copy-source buffer 121a to the copy-destination buffer 221a in advance and then transferring the remaining differential bitmap 13, the data in the copy-source buffer 121a is transmitted to the copy-destination buffer 221a without reflecting the data to the differential bitmap 13.

The data in the copy-source buffer 121a is managed with integrity for each generation. Therefore, in copying by buffer transfer, data saving process using the save area 26 is not performed in the copy-destination housing 20. Therefore, the transfer amount in differential copying using the differential bitmap 13 may be reduced, and the capacity for the save area 26 may be reduced.

Still further, in buffer transfer from the copy-source buffer 121a to the copy-destination buffer 221a at the time of recovery from a halt state, the copy scheduler 11 transmits only the update data to be reflected. That is, as for repeated update locations in the plurality of generations of the copy-source buffer 121a, only the data of a newer generation is transmitted, and transfer of data of an older generation is deterred. With this, the data amount to be transmitted may be decreased, and the time for buffer transfer may be reduced.

Still further, in differential copying from the plurality of copy-source housings 10, differential copying from the copy-source housing 10 with a high priority level is prioritized. With this, by prioritizing differential copying where the copy-source housing 10 and the copy-destination housing 20 are desired to be made equivalent to each other at an early stage, the copy-source housing 10 and the copy-destination housing 20 may become equivalent to each other earlier than those in other differential copying. In particular, by increasing the priority level of a copy session with a large update amount, the capacity for the save area 26 may be reduced.

The technology disclosed herein is not restricted to the above-described embodiments, and may be implemented as being variously modified in a range not deviating from the gist of the embodiments. Each configuration and process of the present embodiments may be optionally selected or may be combined as appropriate.

While a bit string of two bits is allocated to each unit area as update count information in the differential bitmap 13 in the above-described embodiments, this is not meant to be restrictive. A bit string of three or more bits may be allocated to each unit area as update count information.

Also, in the above-described embodiments, for unit areas corresponding to the bit string of "2", which is a predetermined threshold, or more are regarded as frequently updated locations, and transferring data at these locations from the copy-source LUN 12 to the copy-destination LUN 22 is deterred. However, this is not meant to be restrictive. That is, the threshold for regarding an area as a frequently updated location may be another value equal to or larger than "3". As such, various modifications may be made for implementation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A copy control apparatus, comprising:
   a processor configured to
   record, in update location information, an update count for each of sectional areas obtained by sectioning a copy-source area, the update count indicating a number of updates of data in a sectional area, the update count being indicative of more than two values,
   perform first copy of copying data in the copy-source area to a copy-destination area based on the update location information,
   deter the first copy for data in a sectional area for which an update count indicating more than a predetermined number is recorded in the update location information,
   store updated data in an updating order in a copy-source buffer area, the updated data being data in the copy-source area and updated in the updating order, the copy-source buffer area being divided into generations,
   perform second copy of copying data in the copy-source buffer area to the copy-destination area, and
   deter the second copy for first data in the copy-source buffer area of a first generation when the copy-source buffer area of a second generation later than the first generation includes second data, the first data being data in a first location in the copy-source area, the second data being data in the first location in the copy-source area.

2. The copy control apparatus according to claim 1, wherein
   the processor is further configured to
   perform the first copy according to a parameter based on a priority level, the priority level being set to the copy-source area relative to another copy-source area.

3. A copy control method, comprising:
   recording by a computer, in update location information, an update count for each of sectional areas obtained by sectioning a copy-source area, the update count indicating a number of updates of data in a sectional area, the update count being indicative of more than two values;
   performing first copy of copying data in the copy-source area to a copy-destination area based on the update location information;
   deterring the first copy for data in a sectional area for which an update count indicating more than a predetermined number is recorded in the update location information;
   storing updated data in an updating order in a copy-source buffer area, the updated data being data in the copy-source area and updated in the updating order, the copy-source buffer area being divided into generations;
   performing second copy of copying data in the copy-source buffer area to the copy-destination area; and
   deterring the second copy for first data in the copy-source buffer area of a first generation when the copy-source buffer area of a second generation later than the first generation includes second data, the first data being data in a first location in the copy-source area, the second data being data in the first location in the copy-source area.

4. The copy control method according to claim 3, further comprising:
   performing the first copy according to a parameter based on a priority level, the priority level being set to the copy-source area relative to another copy-source area.

5. A non-transitory computer-readable recording medium having stored therein a program for causing a computer to execute a process, the process comprising:
   recording, in update location information, an update count for each of sectional areas obtained by sectioning a copy-source area, the update count indicating a number of updates of data in a sectional area, the update count being indicative of more than two values;
   performing first copy of copying data in the copy-source area to a copy-destination area based on the update location information;
   deterring the first copy for data in a sectional area for which an update count indicating more than a predetermined number is recorded in the update location information;
   storing updated data in an updating order in a copy-source buffer area, the updated data being data in the copy-source area and updated in the updating order, the copy-source buffer area being divided into generations;
   performing second copy of copying data in the copy-source buffer area to the copy-destination area; and
   deterring the second copy for first data in the copy-source buffer area of a first generation when the copy-source buffer area of a second generation later than the first generation includes second data, the first data being data in a first location in the copy-source area, the second data being data in the first location in the copy-source area.

6. The non-transitory computer-readable recording medium according to claim 5, the process further comprising:

performing the first copy according to a parameter based on a priority level, the priority level being set to the copy-source area relative to another copy-source area.

* * * * *